US012812719B2

(12) United States Patent
Nilsson et al.

(10) Patent No.: US 12,812,719 B2
(45) Date of Patent: Nov. 24, 2026

(54) METHOD FOR HANDLING DL UL TCI STATES

(71) Applicant: Telefonaktiebolaget LM Ericsson (publ), Stockholm (SE)

(72) Inventors: Andreas Nilsson, Gothenburg (SE); Siva Muruganathan, Stittsville (CA); Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 284 days.

(21) Appl. No.: 18/285,872

(22) PCT Filed: Apr. 6, 2022

(86) PCT No.: PCT/EP2022/059125
§ 371 (c)(1),
(2) Date: Oct. 6, 2023

(87) PCT Pub. No.: WO2022/214543
PCT Pub. Date: Oct. 13, 2022

(65) Prior Publication Data

US 2024/0107612 A1 Mar. 28, 2024

Related U.S. Application Data

(60) Provisional application No. 63/171,288, filed on Apr. 6, 2021.

(51) Int. Cl.
*H04W 76/20* (2018.01)
*H04L 5/00* (2006.01)
(Continued)

(52) U.S. Cl.
CPC ........... *H04W 76/20* (2018.02); *H04L 5/0051* (2013.01); *H04W 16/28* (2013.01); *H04W 72/231* (2023.01)

(58) Field of Classification Search
CPC ... H04W 76/20; H04W 16/28; H04W 72/231; H04L 5/0051; H04B 7/0639; H04B 7/065; H04B 7/088
See application file for complete search history.

(56) References Cited

U.S. PATENT DOCUMENTS

2021/0067979 A1 3/2021 Rahman et al.
2021/0136802 A1 5/2021 Cirik et al.
(Continued)

FOREIGN PATENT DOCUMENTS

CN 111586862 A 8/2020
JP 2023539176 A 9/2023
(Continued)

OTHER PUBLICATIONS

Author Unknown, "Technical Specification Group Radio Access Network; NR; Physical layer procedures for data (Release 16)," Technical Specification 38.214, Version 16.3.0, Sep. 2020, 3GPP Organizational Partners, 166 pages.
(Continued)

*Primary Examiner* — Afshawn M Towfighi
(74) *Attorney, Agent, or Firm* — Withrow & Terranova, PLLC

(57) ABSTRACT

A method for handling Downlink (DL) Uplink (UL) Transmission Configuration Indicator (TCI) states is disclosed herein. More specifically, methods performed by a wireless device and a base station for handling DL UL TCI states are provided. The methods disclosed herein can be beneficial to enable dynamic power control in the event of Maximum Permissible Exposure (MPE), wherein one beam pair link is best for DL signals/channels while another beam pair link is best for UL signals/channels.

18 Claims, 20 Drawing Sheets

(51) Int. Cl.
*H04W 16/28* (2009.01)
*H04W 72/231* (2023.01)

(56) References Cited

U.S. PATENT DOCUMENTS

| | | | |
|---|---|---|---|
| 2021/0360594 A1 | 11/2021 | Park et al. | |
| 2021/0385056 A1* | 12/2021 | Zhou | H04B 7/0404 |
| 2021/0385832 A1* | 12/2021 | Zhang | H04B 7/06968 |
| 2022/0030480 A1 | 1/2022 | Kung et al. | |
| 2022/0061117 A1 | 2/2022 | Liou et al. | |
| 2022/0200680 A1 | 6/2022 | Farag et al. | |
| 2022/0201695 A1 | 6/2022 | Landis et al. | |
| 2022/0210781 A1 | 6/2022 | Farag et al. | |
| 2022/0217695 A1* | 7/2022 | Liou | H04B 7/06952 |
| 2022/0225369 A1* | 7/2022 | Park | H04B 7/06952 |
| 2022/0256519 A1 | 8/2022 | Jeon et al. | |
| 2022/0338235 A1 | 10/2022 | Bagheri et al. | |
| 2022/0345272 A1 | 10/2022 | Guo | |
| 2023/0091462 A1 | 3/2023 | Babaei | |
| 2023/0291533 A1* | 9/2023 | Zhou | H04B 7/06966 |
| 2023/0300604 A1 | 9/2023 | Zhou et al. | |
| 2023/0413283 A1 | 12/2023 | Matsumura et al. | |
| 2024/0089943 A1* | 3/2024 | Yu | H04B 7/06964 |
| 2024/0155649 A1* | 5/2024 | Bai | H04L 1/0004 |
| 2026/0239300 A1 | 8/2026 | Zheng et al. | |

FOREIGN PATENT DOCUMENTS

| | | |
|---|---|---|
| WO | 2020157703 A1 | 8/2020 |
| WO | 2021198988 A1 | 10/2021 |
| WO | 2022029738 A1 | 2/2022 |
| WO | 2022039481 A1 | 2/2022 |
| WO | 2022093098 A1 | 5/2022 |
| WO | 2022144837 A1 | 7/2022 |
| WO | 2022146224 A2 | 7/2022 |

OTHER PUBLICATIONS

Author Unknown, "Technical Specification Group Radio Access Network; NR; Medium Access Control (MAC) protocol specification (Release 16)," Technical Specification 38.321, Version 16.2.1, Sep. 2020, 3GPP Organizational Partners, 154 pages.

Author Unknown, "Technical Specification Group Radio Access Network; NR; Radio Resource Control (RRC) protocol specification (Release 16)," Technical Specification 38.331, Version 16.2.0, Sep. 2020, 3GPP Organizational Partners, 921 pages.

CMCC, "R1-2008000: Enhancement on multi-beam operation," 3GPP TSG RAN WG1 #103-e, Oct. 26-Nov. 13, 2020, Electronic Meeting, 6 pages.

Futurewei, "R1-2007546: Enhancement on multi-beam operation," 3GPP TSG RAN WG1 Meeting #103-e, Oct. 26-Nov. 13, 2020, Electronic Meeting, 9 pages.

Lenovo, et al., "R1-2008910: Enhancements on Multi-beam Operation," 3GPP TSG RAN WG1#103-e, Oct. 26-Nov. 13, 2020, Electronic Meeting, 10 pages.

MCC Support, "R1-2106402: Final Report of 3GPP TSG RAN WG1 #105-e V1.0.0," 3GPP TSG RAN WG1 Meeting #106-e, Aug. 16-27, 2021, Electronic Meeting, 141 pages.

Mediatek Inc., "R1-2100588: Enhancement on multi-beam operation," 3GPP TSG RAN WG1 #104-e, Jan. 25-Feb. 5, 2021, Electronic Meeting, 27 pages.

Qualcomm Incorporated, "R1-2009250: Enhancements on Multi-beam Operation," 3GPP TSG RAN WG1 Meeting #103-e, Oct. 26-Nov. 13, 2020, Electronic Meeting, 12 pages.

Samsung, "R1-2008148: Multi-beam enhancements," 3GPP TSG RAN WG1 #103-e, Oct. 26-Nov. 13, 2020, Electronic Meeting, 20 pages.

ZTE, "R1-2003483: Preliminary views on further enhancement for NR MIMO," 3GPP TSG RAN WG1 Meeting #101-e, May 25-Jun. 5, 2020, 3GPP Organizational Partners, 18 pages.

International Search Report and Written Opinion for International Patent Application No. PCT/SE2021/051319, mailed Jul. 5, 2022, 16 pages.

International Search Report and Written Opinion for International Patent Application No. PCT/IB2021/062495, mailed Apr. 13, 2022, 23 pages.

International Search Report and Written Opinion for International Patent Application No. PCT/EP2022/059125, mailed Aug. 1, 2022, 12 pages.

Written Opinion for International Patent Application No. PCT/EP2022/059125, mailed Feb. 20, 2023, 6 pages.

International Preliminary Report on Patentability for International Patent Application No. PCT/EP2022/059125, mailed Jul. 10, 2023, 21 pages.

Decision of Refusal for Japanese Patent Application No. 2023-561401, mailed May 19, 2025, 5 pages.

Examination Report for European Patent Application No. 22721046.5, mailed Jul. 17, 2025, 6 pages.

Notice of Reasons for Refusal for Japanese Patent Application No. 2023-561401, mailed Nov. 29, 2024, 13 pages.

Decision to Grant a Patent for Japanese Patent Application No. 2023-561401, mailed Dec. 23, 2025, 5 pages.

OPPO, "R1-2005983: Enhancements on Multi-Beam Operation," 3GPP TSG RAN WG1 #102-e, Aug. 17-28, 2020, Electronic Meeting, 4 pages.

Sony, "R1-208346: Considerations on the enhancement of multi-beam operation," 3GPP TSG RAN WG1 #103e, Oct. 26-Nov. 13, 2020, Electronic Meeting, 12 pages.

Written Opinion for Singapore Patent Application No. 1120230760W, mailed Feb. 20, 2026, 6 pages.

* cited by examiner

```
TCI-State ::=                      SEQUENCE {
    tci-StateId                        TCI-StateId,
    qcl-Type1                          QCL-Info,
    qcl-Type2                          QCL-Info
    ...
}

QCL-Info ::=                       SEQUENCE {
    cell                               ServCellIndex
    bwp-Id                             BWP-Id
    referenceSignal                    CHOICE {
        csi-rs                             NZP-CSI-RS-ResourceId,
        ssb                                SSB-Index
    },
    qcl-Type                           ENUMERATED {typeA, typeB, typeC, typeD},
    ...
}
```

FIG. 3

Joint UL/DL beam indication

| TCI field Codepoint | 0 | 1 | 2 | 3 | 4 | 5 | 6 | 7 |
|---|---|---|---|---|---|---|---|---|
| DL TCI states | DL TCI 3 | DL TCI 7 | DL TCI 9 | DL TCI 10 | DL TCI 25 | DL TCI 36 | DL TCI 36 | DL TCI 36 |

*FIG. 7*

Separate UL/DL beam indication

| TCI field Codepoint | 0 | 1 | 2 | 3 | 4 | 5 | 6 | 7 |
|---|---|---|---|---|---|---|---|---|
| DL TCI states | DL TCI 3 | DL TCI 7 | DL TCI 9 | DL TCI 10 | DL TCI 25 | DL TCI 36 | DL TCI 12 | DL TCI31 |
| UL TCI states | UL TCI2 | UL TCI9 | UL TCI 1 | UL TCI 12 | UL TCI 7 | UL TCI 20 | UL TCI 42 | UL TCI 57 |

*FIG. 8*

| TCI field Codepoint | 0 | 1 | 2 | 3 | 4 | 5 | 6 | 7 |
|---|---|---|---|---|---|---|---|---|
| DL TCI states | DL TCI 3 | DL TCI 7 | DL TCI 9 | DL TCI 10 | DL TCI 25 | DL TCI 36 | | |
| UL TCI states | | | UL TCI 1 | UL TCI 12 | UL TCI 7 | UL TCI 20 | UL TCI 42 | UL TCI 57 |

*FIG. 14*

| TCI field Codepoint | 0 | 1 | 2 | 3 | 4 | 5 | 6 | 7 |
|---|---|---|---|---|---|---|---|---|
| TCI states | DL TCI 3 | DL TCI 7 | Joint TCI 9 | Joint TCI 10 | Joint TCI 25 | UL TCI 36 | UL TCI 36 | UL TCI 36 |

*FIG. 15*

| TCI field Codepoint | 0 | 1 | 2 | 3 | 4 | 5 | 6 | 7 |
|---|---|---|---|---|---|---|---|---|
| DL TCI states | DL TCI 3 | DL TCI 7 | DL TCI 9 | DL TCI 10 | DL TCI 25 | DL TCI 36 | DL TCI 12 | DL TCI 31 |
| UL TCI states | | | UL TCI 1 | UL TCI 12 | UL TCI 7 | UL TCI 20 | | |

*FIG. 16*

METHOD FOR HANDLING DL UL TCI STATES

This application is a 35 U.S.C. § 371 national phase filing of International Application No. PCT/EP2022/059125, filed Apr. 6, 2022, which claims the benefit of provisional patent application Ser. No. 63/171,288, filed Apr. 6, 2021, disclosures of which are incorporated herein by reference in their entireties.

TECHNICAL FIELD

The technology of the disclosure relates generally to handling Downlink (DL) Uplink (UL) Transmission Configuration Indicator (TCI) states.

BACKGROUND

The new generation mobile wireless communication system (5G) or New Radio (NR) supports a diverse set of use cases and a diverse set of deployment scenarios.

NR uses Cyclic Prefix Orthogonal Frequency Division Multiplexing (CP-OFDM) in the Downlink (DL) (i.e., from a network node, gNB, eNB, or base station, to a user equipment or UE) and both CP-OFDM and Discrete Fourier Transform (DFT)-spread OFDM (DFT-S-OFDM) in the Uplink (UL) (i.e., from UE to gNB). In the time domain, NR downlink and uplink physical resources are organized into equal-sized subframes of 1 ms each. A subframe is further divided into multiple slots of equal duration.

The slot length depends on subcarrier spacing. For subcarrier spacing of $\Delta f=15$ kHz, there is only one slot per subframe and each slot always consists of 14 OFDM symbols, irrespectively of the subcarrier spacing.

Typical data scheduling in NR are per slot basis, an example is shown in FIG. 1 where the first two symbols contain Physical Downlink Control Channel (PDCCH) and the remaining 12 symbols contain Physical Data Channel (PDCH), either a Physical Downlink Data Channel (PDSCH) or Physical Uplink Data Channel (PUSCH).

Different subcarrier spacing values are supported in NR. The supported subcarrier spacing values (also referred to as different numerologies) are given by $\Delta f=(15\times 2^{\alpha})$ kHz where $\alpha$ is a non-negative integer. $\Delta f=15$ kHz is the basic subcarrier spacing that is also used in Long-Term Evolution (LTE). The slot durations at different subcarrier spacings are shown in Table 1.

TABLE 1

Slot length at different numerologies

| Numerology | Slot Length | RB BW |
|---|---|---|
| 15 kHz | 1 ms | 180 kHz |
| 30 kHz | 0.5 ms | 360 kHz |
| 60 kHz | 0.25 ms | 720 kHz |
| 120 kHz | 125 µs | 1.44 MHz |
| 240 kHz | 62.5 µs | 2.88 MHz |

In the frequency domain physical resource definition, a system bandwidth is divided into Resource Blocks (RBs), each corresponding to 12 contiguous subcarriers. The Common RBs (CRB) are numbered starting with 0 from one end of the system bandwidth. The UE is configured with one or up to four Bandwidth Parts (BWPs), which may be a subset of the RBs supported on a carrier. Hence, a BWP may start at a CRB larger than zero. All configured BWPs have a common reference, the CRB 0. Hence, a UE can be configured with a narrow BWP (e.g., 10 MHz) and a wide BWP (e.g., 100 MHz), but only one BWP can be active for the UE at a given point in time. The Physical RBs (PRBs) are numbered from 0 to N−1 within a BWP (but the 0:th PRB may thus be the K:th CRB where K>0).

The basic NR physical time-frequency resource grid is illustrated in FIG. 2, where only one RB within a 14-symbol slot is shown. One OFDM subcarrier during one OFDM symbol interval forms one Resource Element (RE).

Downlink transmissions can be dynamically scheduled, i.e., in each slot the gNB transmits Downlink Control Information (DCI) over PDCCH about which UE data is to be transmitted to and which RBs in the current downlink slot the data is transmitted on. PDCCH is typically transmitted in the first one or two OFDM symbols in each slot in NR. The UE data are carried on PDSCH. A UE first detects and decodes PDCCH and if the decoding is successful, the UE then decodes the corresponding PDSCH based on the decoded control information in the PDCCH.

Uplink data transmission can also be dynamically scheduled using PDCCH. Similar to downlink, a UE first decodes uplink grants in PDCCH and then transmits data over PUSCH based the decoded control information in the uplink grant such as modulation order, coding rate, uplink resource allocation, etc.

In NR, several signals can be transmitted from different antenna ports of a same base station. These signals can have the same large-scale properties such as Doppler shift/spread, average delay spread, or average delay. These antenna ports are then said to be Quasi Co-Located (QCL).

If the UE knows that two antenna ports are QCL with respect to a certain parameter (e.g., Doppler spread), the UE can estimate that parameter based on one of the antenna ports and apply that estimate for receiving a signal on the other antenna port.

For example, there may be a QCL relation between a Channel State Information Reference Signal (CSI-RS) for a Tracking Reference Signal (TRS) and the PDSCH Demodulation Reference Signal (DMRS). When the UE receives the PDSCH DMRS, the UE can use the measurements already made on the TRS to assist the DMRS reception.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}

Type B: {Doppler shift, Doppler spread}

Type C: {average delay, Doppler shift}

Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. This is helpful for a UE that uses analog beamforming to receive signals, since the UE needs to adjust its RX beam in some direction prior to receiving a certain signal. If the UE knows that the signal is spatially QCL with some other signal the UE has received earlier, then the UE can safely use the same RX beam to also receive this signal. Note that for beam management, the discussion mostly revolves around QCL Type D, but it is also necessary to convey a Type A QCL relation for the RSs to the UE, so that it can estimate all the relevant large-scale parameters.

Typically, this is achieved by configuring the UE with a CSI-RS for TRS for time/frequency offset estimation. To be able to use any QCL reference, the UE would have to receive it with a sufficiently good Signal to Interference and Noise Ratio (SINR). In many cases, this means that the TRS must be transmitted in a suitable beam to a certain UE.

To introduce dynamics in beam and Transmission/Reception Point (TRP) selection, the UE can be configured through Radio Resource Control (RRC) signaling with up to 128 TCI (Transmission Configuration Indicator) states. The TCI state information element is shown in FIG. 3.

Each TCI state contains QCL information related to one or two RSs. For example, a TCI state may contain CSI-RS1 associated with QCL Type A and CSI-RS2 associated with QCL Type D. If a third RS, e.g., the PDCCH DMRS, has this TCI state as a QCL source, it means that the UE can derive Doppler shift, Doppler spread, average delay, delay spread from CSI-RS1 and Spatial Rx parameter (i.e., the RX beam to use) from CSI-RS2 when performing the channel estimation for the PDCCH DMRS.

A first list of available TCI states is configured for PDSCH, and a second list of TCI states is configured for PDCCH. Each TCI state contains a pointer, known as TCI State ID, which points to the TCI state. The network then activates via MAC CE one TCI state for PDCCH (i.e., provides a TCI for PDCCH) and up to eight TCI states for PDSCH. The number of active TCI states the UE supports is a UE capability, but the maximum is 8.

Assume a UE has 4 activated TCI states (from a list of 64 totally configured TCI states). Hence, 60 TCI states are inactive for this particular UE and the UE needs not be prepared to have large scale parameters estimated for those inactive TCI states. But the UE continuously tracks and updates the large scale parameters for the RSs in the 4 active TCI states. When scheduling a PDSCH to a UE, the DCI contains a pointer to one activated TCI state. The UE then knows which large scale parameter estimate to use when performing PDSCH DMRS channel estimation and thus PDSCH demodulation.

As long as the UE can use any of the currently activated TCI states, it is sufficient to use DCI signaling. However, at some point in time, none of the RSs in the currently activated TCI states can be received by the UE, i.e., when the UE moves out of the beams in which the RSs in the activated TCI states are transmitted. When this happens (or actually before this happens), the gNB would have to activate new TCI states. Typically, since the number of activated TCI states is fixed, the gNB would also have to deactivate one or more of the currently activated TCI states.

The two-step procedure related to TCI state update is depicted in FIG. 4.

TCI state activation/deactivation for UE-specific PDSCH may be provided via a Medium Access Control (MAC) Control Element (CE). The details of MAC CE signaling that is used to activate/deactivate TCI states for UE specific PDSCH are now discussed. The structure of the MAC CE for activating/deactivating TCI states for UE specific PDSCH is given in FIG. 5.

As shown in FIG. 5, the MAC CE contains the following fields:

- Serving Cell ID: This field indicates the identity of the Serving Cell for which the MAC CE applies. The length of the field is 5 bits;
- BWP ID: This field contains the ID corresponding to a downlink bandwidth part for which the MAC CE applies. The BWP ID is given by the higher layer parameter BWP-Id as specified in 3GPP TS 38.331. The length of the BWP ID field is 2 bits since a UE can be configured with up to 4 BWPs for DL;
- A variable number of fields Ti: If the UE is configured with a TCI state with TCI State ID i, then then the field Ti indicates the activation/deactivation status of the TCI state with TCI State ID i. If the UE is not configured with a TCI state with TCI State ID i, the MAC entity shall ignore the Ti field. The Ti field is set to "1" to indicate that the TCI state with TCI State ID i shall be activated and mapped to the codepoint of the DCI Transmission Configuration Indication field, as specified in 3GPP TS 38.214. The Ti field is set to "0" to indicate that the TCI state with TCI State ID i shall be deactivated and is not mapped to the codepoint of the DCI Transmission Configuration Indication field. It should be noted that the codepoint to which the TCI State is mapped is determined by the ordinal position among all the TCI States with Ti field set to "1". That is the first TCI State with Ti field set to "1" shall be mapped to the codepoint value 0 of DCI Transmission Configuration Indication field, the second TCI State with Ti field set to "1" shall be mapped to the codepoint value 1 of DCI Transmission Configuration Indication field, and so on. In NR Rel-15, the maximum number of activated TCI states is 8
- A Reserved bit R: this bit is set to '0' in NR Rel-15

Note that the TCI States Activation/Deactivation for UE-specific PDSCH MAC CE is identified by a MAC Protocol Data Unit (PDU) subheader with Logical Channel ID (LCID) as specified in Table 6.2.1-1 of 3GPP TS 38.321. The MAC CE for Activation/Deactivation of TCI States for UE-specific PDSCH has variable size.

TCI state indication for UE-specific PDSCH may also be provided via DCI. The gNB can use DCI format 1_1 or 1_2 to indicate to the UE to use one of the activated TCI states for the subsequent PDSCH reception. The field being used in the DCI is Transmission Configuration Indication (TCI), which is 3 bits if tci-PresentInDCI is "enabled" or tci-PresentForDCI-Format1-2-r16 is present respectively for DCI format 1_1 and DCI 1_2 by higher layer. One example of such a DCI indication is depicted in FIG. 6.

DCI code point 0 indicates the first TCI state index in the list of TCI states, DCI code point 1 indicates the second TCI state index in the list, and so on.

In 3GPP Rel-17 a new enhanced TCI state framework will be specified. In meeting RAN1 #103-e, it was agreed that the new TCI state framework should include a three stage TCI state indication (in a similar way as was described above for PDSCH) for all or a subset of all DL and/or UL channels/signals. In the first stage, RRC is used to configure a pool of TCI states. In the second stage, one or more of the RRC configured TCI states are activated via MAC-CE signaling. Finally, in the third stage, DCI signaling is used to select one of the TCI states that was activated via MAC-CE. The TCI states used for DL and UL channels/signals, can either be taken from the same pool of TCI states or from separate pools of TCI states (i.e., from separate DL TCI state and UL TCI state pools).

In RAN1 #103-e meeting, it was agreed to support both joint beam indication ("Joint DL/UL TCI") and separate DL/UL beam indication ("Separate DL/UL TCI"), as can be seen below. For Joint DL/UL TCI, a single TCI state (e.g., a DL TCI state or a joint TCI state) is used to determine a TX/RX spatial filter for both DL signals/channels and UL signals/channels. For Separate DL/UL TCI, one TCI state (for example a DL TCI state) can be used to indicate a RX spatial filter for DL signals/channels and a separate TCI state (for example an UL TCI state) can be used to indicate TX spatial filter for UL signals/channels.

Agreement

On beam indication signaling medium to support joint or separate DL/UL beam indication in Rel.17 unified TCI framework:

- Support L1-based beam indication using at least UE-specific (unicast) DCI to indicate joint or separate DL/UL beam indication from the active TCI states
  - The existing DCI formats 1_1 and 1_2 are reused for beam indication
- Support activation of one or more TCI states via MAC CE analogous to Rel.15/16:

Agreement

On Rel-17 unified TCI framework, to accommodate the case of separate beam indication for UL and DL:

- Utilize two separate TCI states, one for DL and one for UL.
- For the separate DL TCI:
  - The source reference signal(s) in M TCIs provide QCL information at least for UE-dedicated reception on PDSCH and for UE-dedicated reception on all or subset of CORESETs in a CC
- For the separate UL TCI:
  - The source reference signal(s) in N TCIs provide a reference for determining common UL TX spatial filter(s) at least for dynamic-grant/configured-grant based PUSCH, all or subset of dedicated PUCCH resources in a CC
  - Optionally, this UL TX spatial filter can also apply to all SRS resources in resource set(s) configured for antenna switching/codebook-based/non-codebook-based UL transmissions
- FFS: Whether the UL TCI state is taken from a common/same or separate TCI state pool from DL TCI state FIG. 7 illustrates a schematic example of how the list of activated DL TCI states and their association to TCI field codepoints in DCI can look for Joint DL/UL TCI. In this case, a single TCI field codepoint in DCI is used to update a DL TCI state, which will be used to determine TX/RX spatial filter for both DL and UL signals/channels. For example, in case a DCI with TCI field codepoint 2 is indicated to the UE, the UE should update the TX/RX spatial filter based on DL TCI state 9 for both DL and UL signals/channels.

FIG. 8 illustrates a schematic example of how a list of activated DL/UL TCI states and their association to TCI field codepoints in DCI might look for Separate DL/UL TCI. Here each TCI field codepoint in DCI is associated with one DL TCI state and one UL TCI state. When a UE is indicated with a certain TCI field codepoint which is mapped to one DL TCI state and one UL TCI state, the UE will activate one DL TCI state and one UL TCI state.

In RAN1 #104-e meeting, it was agreed to support signaling to indicate if Joint DL/UL TCI or Separate DL/UL TCI is applied:

Agreement

On Rel.17 unified TCI framework, by RAN1 #104 bis-e, down select or modify at least one from the following alternatives:

- Alt1. A UE can be dynamically indicated with either joint DL/UL TCI or separate DL/UL TCI
  - Details on dynamic indication are FFS
  - FFS: UE capability for the support of joint DL/UL TCI and/or separate DL/UL TCI
- Alt2A. A UE can be configured with either joint DL/UL TCI or separate DL/UL TCI via RRC signaling
- Alt2B. A UE can be configured with either joint DL/UL TCI, separate DL/UL TCI, or both via RRC signaling
- Alt3. A UE can be configured with either joint DL/UL TCI or separate DL/UL TCI via MAC CE signaling
  - Details on how this is signaled in relation to TCI activation are FFS

SUMMARY

Embodiments disclosed herein include a method for handling Downlink (DL) Uplink (UL) Transmission Configuration Indicator (TCI) states. More specifically, methods performed by a wireless device and a base station for handling DL UL TCI states are provided. The methods disclosed herein can be beneficial to enable dynamic power control in the event of Maximum Permissible Exposure (MPE), wherein one beam pair link is best for DL signals/channels while another beam pair link is best for UL signals/channels.

In one aspect, a method performed by a wireless device for handling downlink and uplink TCI states is provided. The method includes receiving a Downlink Control Information (DCI) comprising an indication that indicates a selected TCI field codepoint among a first subset of TCI field codepoints each associated with a respective downlink TCI state, a second subset of TCI field codepoints each associated with a respective uplink TCI state, and a third subset of TCI field codepoints each associated with a respective downlink TCI state and a respective uplink TCI state. The method also includes performing one or more actions based on the selected TCI field codepoint.

In another aspect, the wireless device is configured by a Medium Access Control (MAC) Control Element (CE) and the MAC CE is configured to: associate each of the first subset of TCI field codepoints with the respective downlink TCI state, associate each of the second subset of TCI field codepoints with the respective uplink TCI state, and associate each of the third subset of TCI field codepoints with the respective downlink TCI state and the respective uplink TCI state.

In another aspect, for each TCI state activated via the MAC CE, an associated field is included to indicate whether the activated TCI state applies to uplink only, downlink only, or both downlink and uplink.

In another aspect, receiving the DCI comprising the indication comprises receiving the indication that indicates the selected TCI field codepoint in the first subset of TCI field codepoints and performing the one or more actions comprises updating a downlink receive spatial filter based on the respective downlink TCI state associated with the selected TCI field codepoint.

In another aspect, the downlink receive spatial filter is updated to a downlink receive spatial filter used to receive a downlink source reference signal in a respective downlink TCI state associated with the selected TCI field codepoint.

In another aspect, performing the one or more actions further comprises maintaining an existing uplink transmit spatial filter.

In another aspect, receiving the DCI comprising the indication comprises receiving the indication that indicates the selected TCI field codepoint in the second subset of TCI field codepoints and performing the one or more actions comprises updating an uplink transmit spatial filter based on the respective uplink TCI state associated with the selected TCI field codepoint.

In another aspect, the uplink transmit spatial filter is updated to one of: an uplink transmit spatial filter used to transmit an uplink source reference signal in the respective uplink TCI state associated with the selected TCI field codepoint and a downlink receive spatial filter used to receive a downlink source reference signal in the respective uplink TCI state associated with the selected TCI field codepoint.

In another aspect, performing one or more actions further comprises maintaining an existing downlink receive spatial filter.

In another aspect, receiving the indication comprises receiving the indication that indicates the selected TCI field codepoint in the third subset of TCI field codepoints and performing the one or more actions comprises-performing a separate-TCI scheme to thereby update a downlink receive spatial filter and an uplink transmit spatial filter based on the respective downlink TCI state and the respective uplink TCI state associated with the selected TCI field codepoint, respectively.

In another aspect, the downlink receive spatial filter is updated to a downlink receive spatial filter used to receive a downlink source reference signal in a respective downlink TCI state associated with the selected TCI field codepoint; and the uplink transmit spatial filter is updated to one of: an uplink transmit spatial filter used to transmit an uplink source reference signal in the respective uplink TCI state associated with the selected TCI field codepoint; and a downlink receive spatial filter used to receive a downlink source reference signal in the respective uplink TCI state associated with the selected TCI field codepoint.

In another aspect, performing one or more actions further comprises updating the downlink receive spatial filter and the uplink transmit spatial filter simultaneously.

In one aspect, a wireless device is provided. The wireless device includes processing circuitry. The processing circuitry is configured to cause the wireless device to receive a DCI comprising an indication that indicates a selected TCI field codepoint among a first subset of TCI field codepoints each associated with a respective downlink TCI state, a second subset of TCI field codepoints each associated with a respective uplink TCI state, and a third subset of TCI field codepoints each associated with a respective downlink TCI state and a respective uplink TCI state. The processing circuitry is configured to cause the wireless device to perform one or more actions based on the selected TCI field codepoint.

In another aspect, the processing circuitry is further configured to cause the wireless device to perform any step of the method performed by the wireless device.

In one aspect, a method performed by a base station for handling downlink and uplink TCI states is provided. The method includes transmitting a DCI comprising an indication that indicates a selected TCI field codepoint among, a first subset of TCI field codepoints each associated with a respective downlink TCI state, a second subset of TCI field codepoints each associated with a respective uplink TCI state, and a third subset of TCI field codepoints each associated with a respective downlink TCI state and a respective uplink TCI state.

In another aspect, the base station configures a wireless device via a Medium Access Control (MAC) Control Element (CE) and the MAC CE is configured to: associate each of the first subset of TCI field codepoints with the respective downlink TCI state, associate each of the second subset of TCI field codepoints with the respective uplink TCI state, and associate each of the third subset of TCI field codepoints with the respective downlink TCI state and the respective uplink TCI state.

In another aspect, for each TCI state activated via the MAC CE, an associated field is included to indicate whether the activated TCI state applies to uplink only, downlink only, or both downlink and uplink.

In another aspect, transmitting the DCI comprising the indication comprises transmitting the indication that indicates the selected TCI field codepoint in the first subset of TCI field codepoints.

In another aspect, transmitting the DCI comprising the indication comprises transmitting the indication that indicates the selected TCI field codepoint in the second subset of TCI field codepoints.

In another aspect, transmitting the DCI comprising the indication comprises transmitting the indication that indicates the selected TCI field codepoint in the third subset of TCI field codepoints.

In one aspect, a base station is provided. The base station includes processing circuitry. The processing circuitry is configured to cause the base station to transmit a DCI comprising an indication that indicates a selected TCI field codepoint among a first subset of TCI field codepoints each associated with a respective downlink TCI state, a second subset of TCI field codepoints each associated with a respective uplink TCI state, and a third subset of TCI field codepoints each associated with a respective downlink TCI state and a respective uplink TCI state.

In another aspect, the processing circuitry is further configured to cause the base station to perform any step in the method performed by the base station.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 provides an exemplary illustration of a Transmission Configuration Indicator (TCI) state information element;

FIG. 7 provides an exemplary illustration as to how a list of activated Downlink (DL) TCI states associated with TCI field codepoints in DCI can look for joint DL/Uplink (UL) TCI;

FIG. 8 provides an exemplary illustration as to how a list of activated DL UL TCI states associated with TCI field codepoints in DCI may look for Separate DL/UL TCI;

FIG. 14 provides an exemplary illustration of how a list of activated DL/UL TCI states mapping to TCI field codepoint in DCI might look for Separate DL/UL TCI according to one embodiment of the present disclosure;

FIG. 15 provides an exemplary illustration of how a list of activated DL/UL TCI states mapping to TCI field codepoint in DCI might look for Separate DL/UL TCI according to an alternative embodiment of the present disclosure;

FIG. 16 illustrates a schematic example of how a first subset of codepoints is mapped to DL TCI states and a second subset of codepoints is mapped to separate UL and DL TCI states;

DETAILED DESCRIPTION

Figure 1:
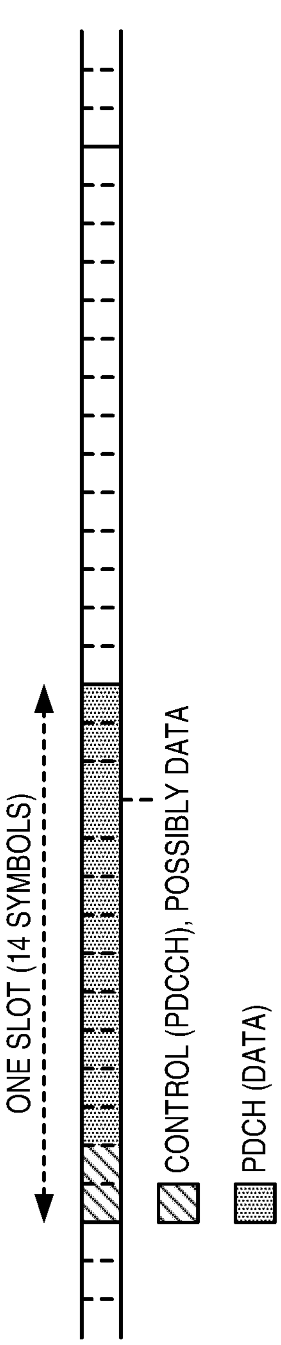
FIG. 1 provides an exemplary illustration of slot-based data scheduling in New Radio (NR)
Figure 2:
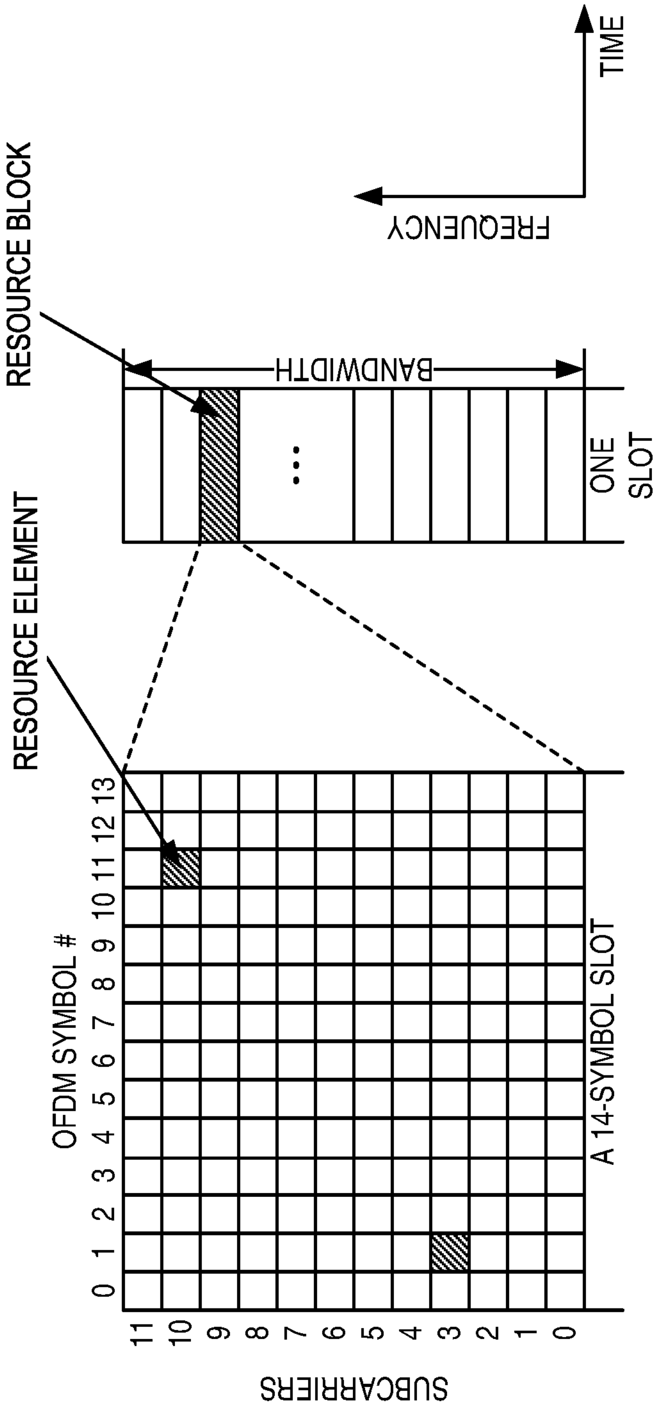
FIG. 2 provides an exemplary illustration of a basic NR physical time-frequency resource grid.
Figure 4:
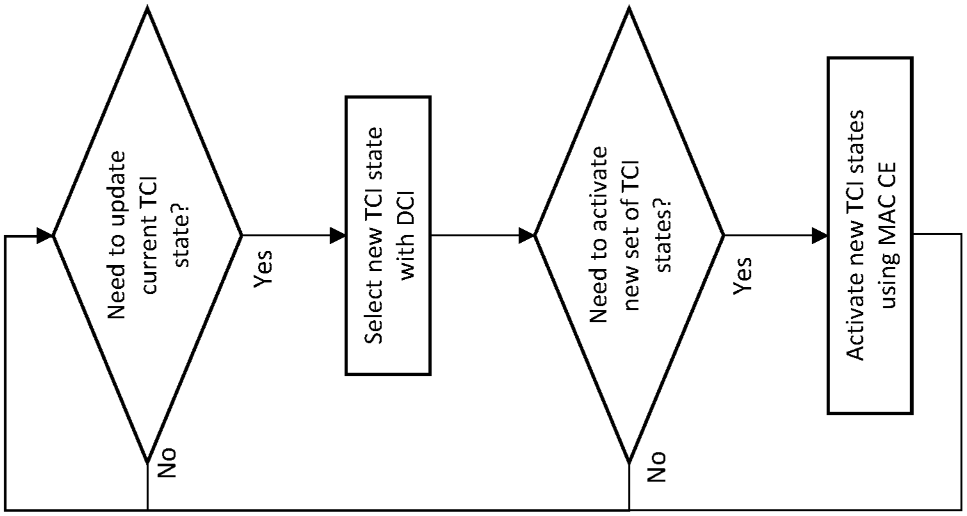
FIG. 4 provides an exemplary illustration of a two-step procedure related to TCI state update.
Figure 5:
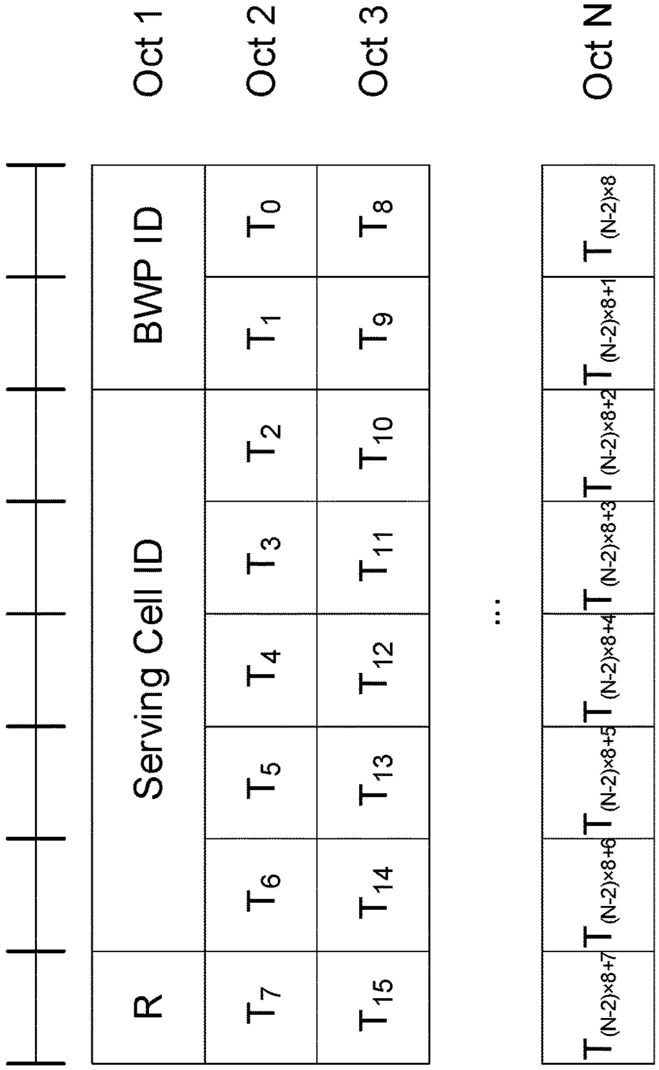
FIG. 5 provides an exemplary illustration of a Medium Access Control (MAC) Control Element (CE) for activating/deactivating TCI states for a User Equipment (UE) specific Physical Downlink Shared Channel (PDSCH)
Figure 6:
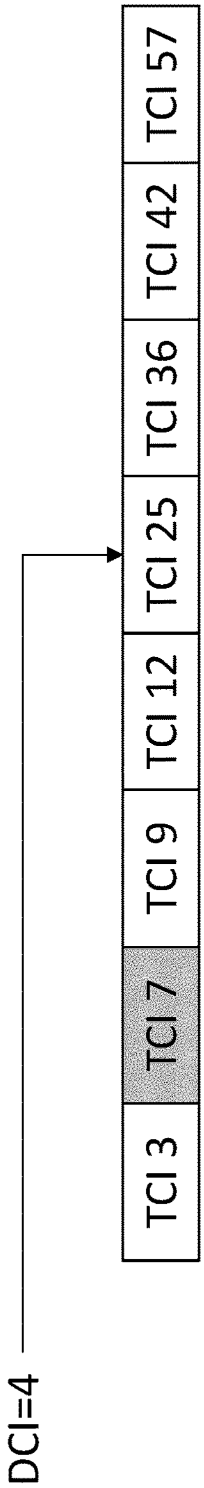
FIG. 6 provides an exemplary illustration of a Downlink Control Information (DCI) indication for indicating to a UE to use one of activated TCI states for subsequent PDSCH reception.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a “network node” is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may be a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term “cell”; however, particularly with respect to 5G NR concepts, beams may be used instead of cells and, as such, it is important to note that the concepts described herein are equally applicable to both cells and beams.

There currently exist certain challenge(s). It remains an open issue as to how the indicated TCI field codepoints should be interpreted by the UE for handling DL/UL TCI states, such as “Separate DL/UL TCI” operation, as an example.

Certain aspects of the present disclosure and their embodiments may provide solutions to the aforementioned or other challenges. Embodiments disclosed herein include methods for handling a combination of “Joint DL/UL TCI” and “Separate DL/UL TCI”.

There are, proposed herein, various embodiments which address one or more of the issues disclosed herein.

In one aspect, a method performed by a wireless device for handling downlink and uplink TCI states is provided. The method includes receiving a DCI comprising an indication that indicates a selected TCI field among: 1) a first subset of TCI field codepoints each associated with a respective downlink TCI state; 2) a second subset of TCI field codepoints each associated with a respective uplink TCI state; and 3) a third subset of TCI field codepoints each associated with one of: a respective downlink TCI state and a respective uplink TCI state; and a respective joint TCI state. The method also includes performing one or more actions based on the selected TCI field codepoint.

In another aspect, a method performed by a base station for handling downlink and uplink TCI states is provided. The method includes transmitting a DCI comprising an indication that indicates a selected TCI field among: 1) a first subset of TCI field codepoints each associated with a respective downlink TCI state; 2) a second subset of TCI field codepoints each associated with a respective uplink TCI state; and 3) a third subset of TCI field codepoints each associated with one of: a respective downlink TCI state and a respective uplink TCI state; and a respective joint TCI state.

Certain embodiments may provide one or more of the following technical advantages. Separate beam pair links for DL/UL signals/channels can for example be beneficial in case an MPE event has occurred, since then it is possible that one beam pair link is best for DL signals/channels, but another beam pair link is best for UL signals/channels (for example if the beam pair link that where best for DL signals/channels is effected by MPE, and the UE therefore has to reduce its UL output power for that beam pair link).

Figure 9:
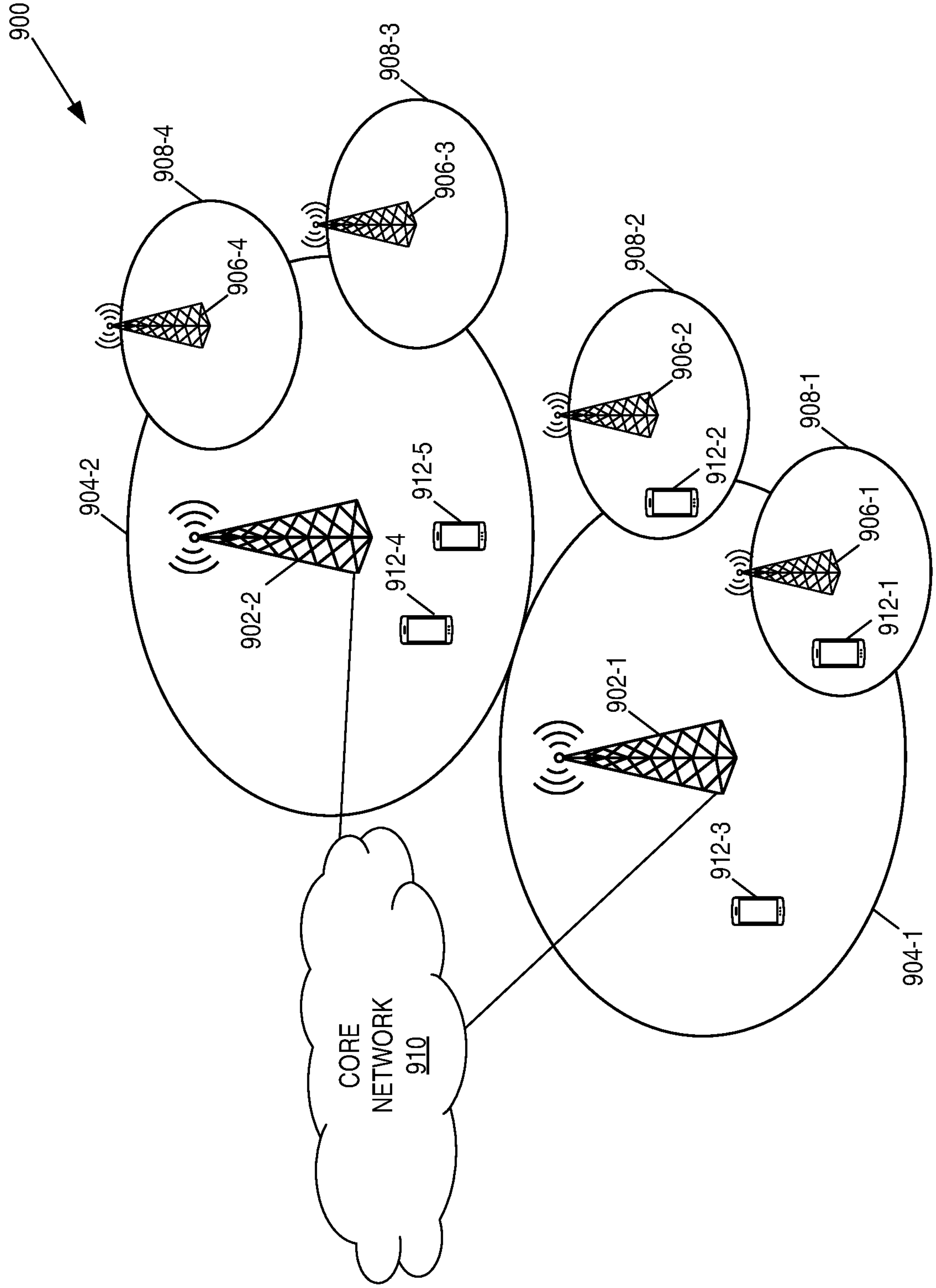
FIG. 9 illustrates one example of a cellular communications system in which embodiments of the present disclosure may be implemented.

FIG. 9 illustrates one example of a cellular communications system 900 in which embodiments of the present disclosure may be implemented. In the embodiments described herein, the cellular communications system 900 is a 5G system (5GS) including a Next Generation RAN (NG-RAN) and a 5G Core (5GC). In this example, the RAN includes base stations 902-1 and 902-2, which in the 5GS include NR base stations (gNBs) and optionally next generation eNBs (ng-eNBs) (e.g., LTE RAN nodes connected to the 5GC), controlling corresponding (macro) cells 904-1 and 904-2. The base stations 902-1 and 902-2 are generally referred to herein collectively as base stations 902 and individually as base station 902. Likewise, the (macro) cells 904-1 and 904-2 are generally referred to herein collectively as (macro) cells 904 and individually as (macro) cell 904. The RAN may also include a number of low power nodes 906-1 through 906-4 controlling corresponding small cells 908-1 through 908-4. The low power nodes 906-1 through 906-4 can be small base stations (such as pico or femto base stations) or RRHs, or the like. Notably, while not illustrated, one or more of the small cells 908-1 through 908-4 may alternatively be provided by the base stations 902. The low power nodes 906-1 through 906-4 are generally referred to herein collectively as low power nodes 906 and individually as low power node 906. Likewise, the small cells 908-1 through 908-4 are generally referred to herein collectively as small cells 908 and individually as small cell 908. The cellular communications system 900 also includes a core network 910, which in the 5G System (5GS) is referred to as the 5GC. The base stations 902 (and optionally the low power nodes 906) are connected to the core network 910.

The base stations 902 and the low power nodes 906 provide service to wireless communication devices 912-1 through 912-5 in the corresponding cells 904 and 908. The wireless communication devices 912-1 through 912-5 are generally referred to herein collectively as wireless communication devices 912 and individually as wireless communication device 912. In the following description, the wireless communication devices 912 are oftentimes UEs, but the present disclosure is not limited thereto.

Figure 10:
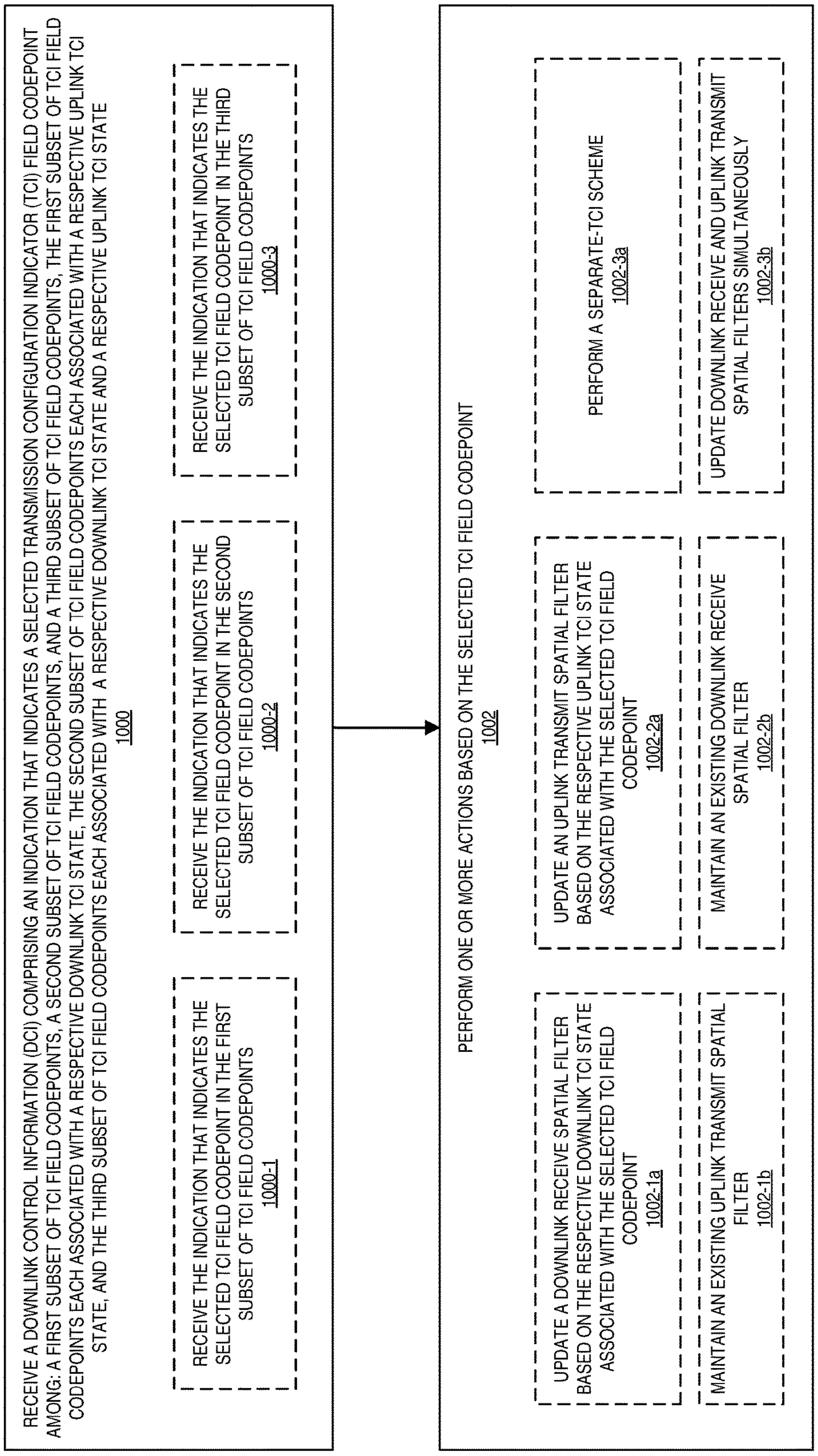
FIG. 10 is a flowchart of an exemplary method performed by a wireless device for handling DL and UL TCI states according to an embodiment of the present disclosure.

FIG. 10 is a flowchart of an exemplary method that can be performed by a wireless device for handling DL UL TCI states according to an embodiment of the present disclosure. According to the method, the wireless device is configured to receive a DCI comprising an indication that indicates a selected TCI codepoint among a first subset of TCI field codepoints each associated with a respective downlink TCI state, a second subset of TCI field codepoints each associated with a respective uplink TCI state, and a third subset of TCI field codepoints each associated with a respective downlink TCI state and a respective uplink TCI state (step 1000).

In an embodiment, receiving the DCI comprising the indication comprises receiving the indication that indicates the selected TCI field codepoint in the first subset of TCI field codepoints (step 1000-1). In another embodiment, receiving the DCI comprising the indication comprises receiving the indication that indicates the selected TCI field codepoint in the second subset of TCI field codepoints (step 1000-2). In another embodiment, receiving the indication comprises receiving the indication that indicates the selected TCI field codepoint in the third subset of TCI field codepoints (step 1000-3).

According to the method, the wireless device is also configured to perform one or more actions based on the selected TCI field codepoint (step 1002). In an embodiment, performing the one or more actions comprises updating a downlink receive spatial filter based on the respective downlink TCI state associated with the selected TCI field codepoint (step 1002-1*a*). In an embodiment, performing the one or more actions further comprises maintaining an existing uplink transmit spatial filter (step 1002-1*b*). In an embodiment, performing the one or more actions comprises updating an uplink transmit spatial filter based on the respective uplink TCI state associated with the selected TCI field codepoint (step 1002-2*a*). In an embodiment, performing one or more actions further comprises maintaining an existing downlink receive spatial filter (step 1002-2*b*). In an embodiment, performing the one or more actions comprises-performing a separate-TCI scheme to thereby update a downlink receive spatial filter and an uplink transmit spatial filter based on the respective downlink TCI state and the respective uplink TCI state associated with the selected TCI field codepoint, respectively (step 1002-3*a*). In an embodiment, performing one or more actions further comprises updating the downlink receive spatial filter and the uplink transmit spatial filter simultaneously (step 1002-3*b*).

Figure 11:
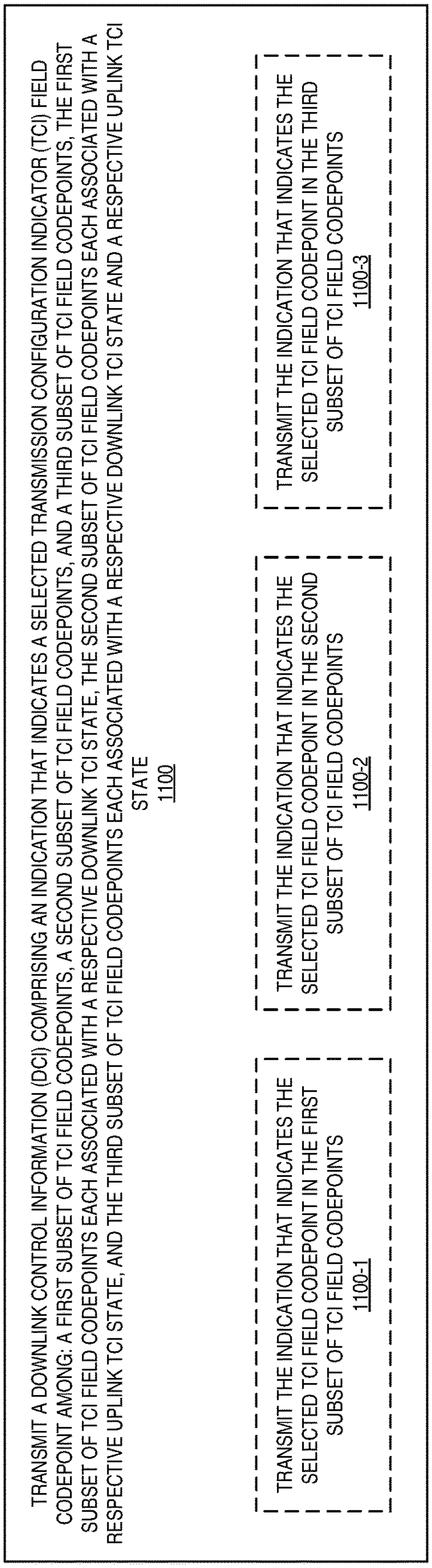
FIG. 11 is a flowchart of an exemplary method performed by a base station for handling DL and UL TCI states according to an embodiment of the present disclosure.

FIG. 11 is a flowchart of an exemplary method that can be performed by a base station for handling DL UL TCI states according to an embodiment of the present disclosure. According to the method, the base station is configured to transmit a Downlink Control Information, DCI, comprising an indication that indicates a selected TCI field codepoint among a first subset of TCI field codepoints each associated with a respective downlink TCI state, a second subset of TCI field codepoints each associated with a respective uplink TCI state, and a third subset of TCI field codepoints each associated with a respective downlink TCI state and a respective uplink TCI state (step 1100). In an embodiment, transmitting the DCI comprising the indication comprises transmitting the indication that indicates the selected TCI field codepoint in the first subset of TCI field codepoints (step 1100-1). In an embodiment, transmitting the DCI comprising the indication comprises transmitting the indication that indicates the selected TCI field codepoint in the second subset of TCI field codepoints (step 1100-2). In an embodiment, transmitting the DCI comprising the indication comprises transmitting the indication that indicates the selected TCI field codepoint in the third subset of TCI field codepoints (step 1100-3). In an embodiment, the base station may be configured to transmit a message that activates or deactivates one or more uplink TCI states (step 1102).

Figure 12:
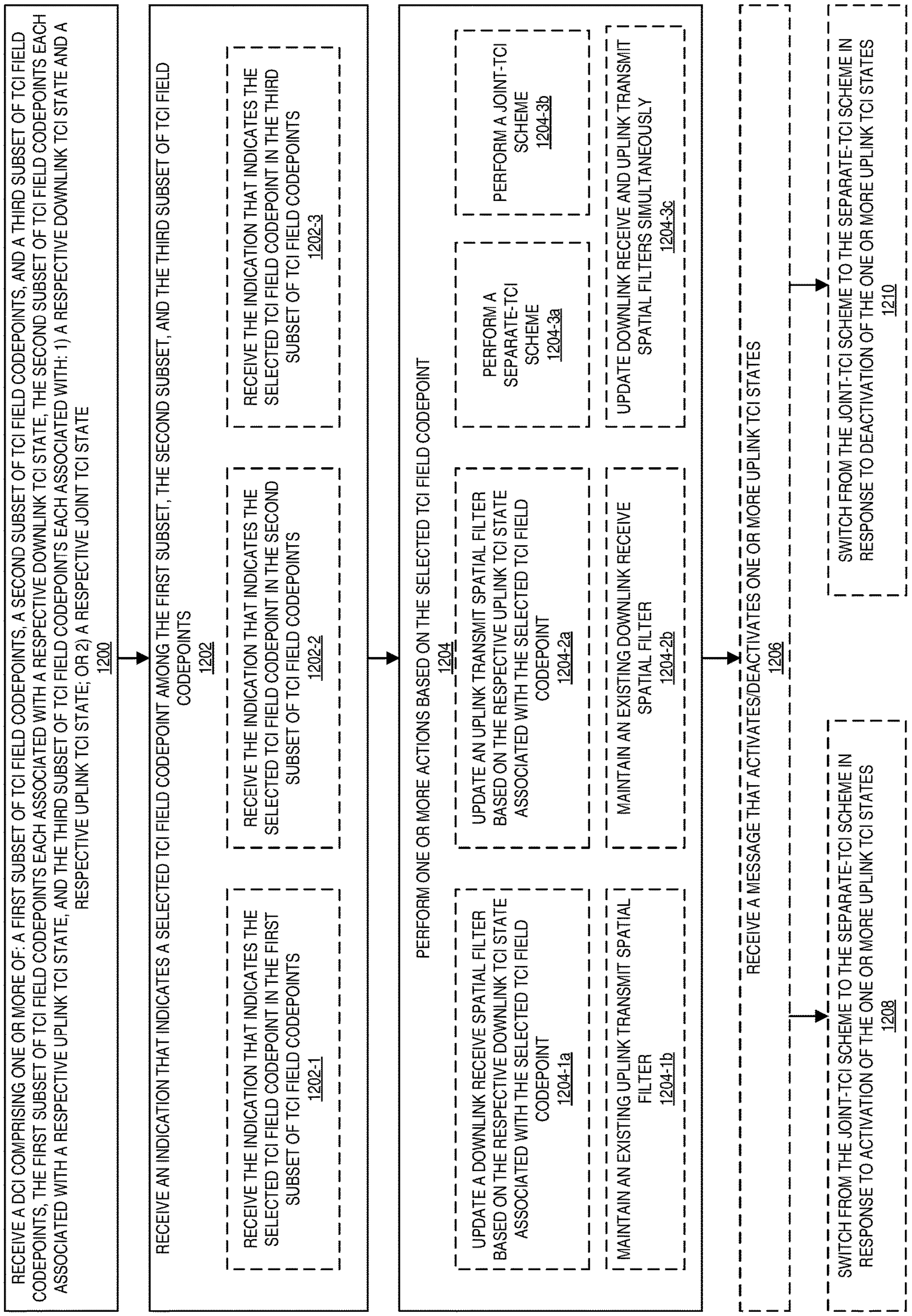
FIG. 12 is a flowchart of an exemplary method performed by a wireless device for handling DL and UL TCI states according to another embodiment of the present disclosure.

FIG. 12 is a flowchart of an exemplary method that can be performed by a wireless device for handling DL UL TCI states according to another embodiment of the present disclosure.

Figure 13:
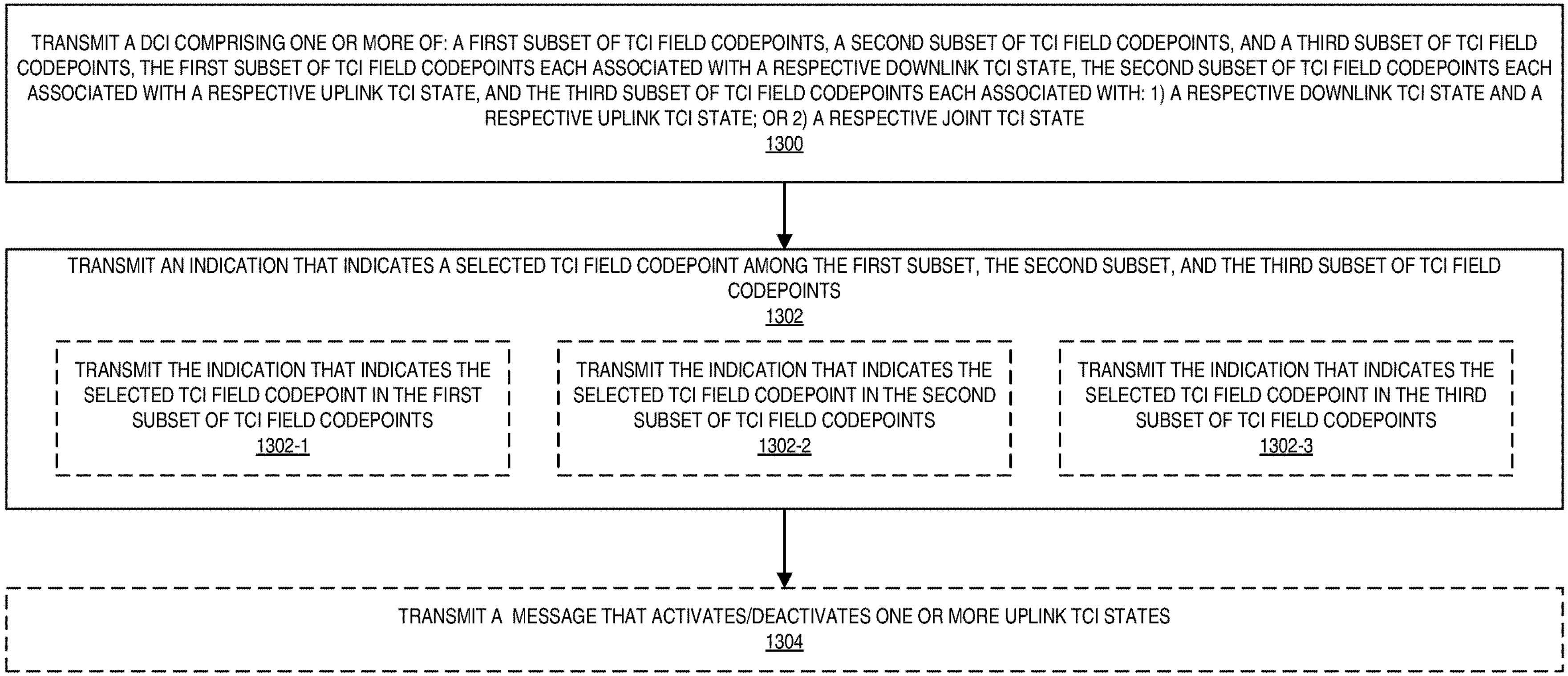
FIG. 13 is a flowchart of an exemplary method performed by a base station for handling DL and UL TCI states according to another embodiment of the present disclosure.

FIG. 13 is a flowchart of an exemplary method that can be performed by a base station for handling DL UL TCI states according to another embodiment of the present disclosure.

Specific embodiments of the present disclosure for handling DL UL TCI states are disclosed below in detail.

In one embodiment (e.g., steps 1000, 1100), TCI field codepoint mapped to a DL TCI state or a UL TCI state can only change the TCI state for the DL link or the UL link. In this embodiment, the mapping of DL/UL TCI states to codepoints in the TCI field in DCI contains three different subsets of codepoints as described below:

- a first subset of codepoints in the TCI field in DCI is mapped to only DL TCI state(s) (e.g., steps 1000-1, 1100-1),
- a second subset of codepoints in the TCI field in DCI is mapped to only UL TCI state(s) (e.g., steps 1000-2, 1100-2), and
- a third subset of codepoints in the TCI field in DCI is mapped both DL TCI state(s) and UL TCI state(s) (e.g., steps 1000-3, 1100-3)

The codepoints in all three subsets of codepoints belong to the TCI field in the same DCI (e.g., same DCI format). The three subsets of codepoints are disjoint sets.

When a UE is indicated with a codepoint from the first subset in DCI, the UE updates the Rx spatial filter based on the DL TCI state that is indicated in the codepoint. That is, the DL Rx spatial filter is updated to the DL Rx spatial filter used to receive the source reference signal (e.g., QCL Type-D reference signal source) in the DL TCI state that is indicated. In some embodiments, when a UE is indicated with a codepoint from the first subset in DCI, the UE only updates the DL Rx spatial filter for DL channels/signals based on the DL TCI state indicated (e.g., step 1002-1*a*) and maintains the current UL Tx spatial filter the UE is using for UL channels/signals (e.g., step 1002-1*b*).

When a UE is indicated with a codepoint from the second subset in DCI, the UE updates the UL Tx spatial filter based on the UL TCI state that is indicated in the codepoint. That is, the UL Tx spatial filter is updated to one of the following:

- the UL Tx spatial filter used to transmit the source reference signal in the UL TCI state, if this source reference signal is an UL reference signal (e.g., SRS).
- the DL Rx spatial filter used to receive the source reference signal in the UL TCI state, if this source reference signal is a DL reference signal (e.g., SSB or CSI-RS). In this case, the updated UL Tx spatial filter points to the same spatial direction as that of the DL Rx spatial filter that was used to receive the source reference signal in the UL TCI state.

In some embodiments, when a UE is indicated with a codepoint from the second subset in DCI, the UE only updates the UL Tx spatial filter for UL channels/signals based on the UL TCI state indicated (e.g., step 1002-2*a*) and maintains the current DL Rx spatial filter the UE is using for DL channels/signals (e.g., 1002-2*b*).

When a UE is indicated with a codepoint from the third subset in DCI, the UE updates the UL Tx spatial filter and the DL Rx spatial filter respectively based on the UL TCI state and DL TCI state that are indicated in the codepoint. The DL Rx spatial filter is updated to the DL Rx spatial filter used to receive the source reference signal (e.g., QCL Type-D reference signal source) in the DL TCI state that is indicated in the codepoint. The UL Tx spatial filter is updated to one of the following:

- the UL Tx spatial filter used to transmit the source reference signal in the UL TCI state, if this source reference signal is an UL reference signal (e.g., SRS).
- the DL Rx spatial filter used to receive the source reference signal in the UL TCI state, if this source reference signal is a DL reference signal (e.g., SSB or CSI-RS). In this case, the updated UL Tx spatial filter points to the same spatial direction as that of the DL Rx spatial filter that was used to receive the source reference signal in the UL TCI state.

In some embodiments, when a UE is indicated with a codepoint from the third subset in DCI, the UE updates the UL Tx spatial filter for UL channels/signals based on the UL TCI state indicated and the DL Tx spatial filter for DL channels/signals based on the DL TCI state indicated (e.g., step 1002-3*a*). In a further embodiment, UL Tx spatial filter and the DL Rx spatial filter are updated simultaneously (e.g., 1002-3*b*).

FIG. 14 illustrates a schematic example of how a list of activated DL/UL TCI states mapping to TCI field codepoint in DCI might look for Separate DL/UL TCI. In this example, a single DCI codepoint can be used to update either only a DL TCI state (codepoint 0 and 1), or only an UL TCI state (codepoint 6 and 7) or both a DL and an UL TCI state (codepoint 2, 3, 4, and 5).

For example, in case the TCI field codepoint in DCI is 2, the UE should update the RX spatial filter based on DL TCI state 9 for DL signals/channels at the same time as it updates the TX spatial filter based on UL TCI state 1 for UL signals/channels. And if the TCI field codepoint in DCI is 0, the UE should only update the RX spatial filter based on DL TCI state 3 for DL signals/channels (i.e., no update for TX spatial filter for UL signals/channels is required). In the same way, if the TCI field codepoint in DCI is 6, the UE should only update the TX spatial filter based on UL TCI state 42 for UL signals/channels (i.e., no update for RX spatial filter for DL signals/channels is required).

In an alternative version of this embodiment, a UE is configured with a list of joint TCI states that provide the source reference signal for updating the DL RX spatial filter for receiving DL channels/signals and the source reference signal for updating the UL Tx spatial filter for transmitting UL channels/signals. The UE in this embodiment is also additionally configured with separate DL TCI states and UL TCI states. In this embodiment, the mapping of joint, DL and UL TCI states to codepoints in the TCI field in DCI contains three different subsets of codepoints as described below:

- a first subset of codepoints in the TCI field in DCI are mapped to only DL TCI state(s),
- a second subset of codepoints in the TCI field in DCI are mapped to only UL TCI state(s), and
- a third subset of codepoints in the TCI field in DCI are mapped to joint TCI state(s).

When a UE is indicated with a codepoint from either the first subset or the second subset in DCI, the UE procedure is the same as described above. However, when a UE is indicated with a codepoint from the third subset in DCI, the UE updates the UL Tx spatial filter and the DL Rx spatial filter both based on the joint TCI state that is indicated in the codepoint. The DL Rx spatial filter is updated to the DL Rx spatial filter used to receive the source reference signal in the joint TCI state that is indicated in the codepoint. The UL Tx spatial filter is updated to the DL Rx spatial filter used to receive the source reference signal in the joint TCI state. In some embodiments, the UL Tx spatial filter and the DL Rx spatial filter are updated simultaneously.

An example of the alternative embodiment is shown in FIG. 15. For example, in case the TCI field codepoint in DCI is 2, the UE should update the RX spatial filter for DL signals/channels at the same time as it updates the TX spatial filter for UL signals/channels both based on joint TCI state 9. And if the TCI field codepoint in DCI is 0, the UE should only update the RX spatial filter based on DL TCI state 3 for DL signals/channels (i.e., no update for TX spatial filter for UL signals/channels is required). In the same way, if the TCI field codepoint in DCI is 6, the UE should only update the TX spatial filter based on UL TCI state 42 for UL signals/channels (i.e., no update for RX spatial filter for DL signals/channels is required).

In another embodiment, TCI field codepoint in DCL associated with a DL TCI state can change the TCI state for the DL link and UL link. In this embodiment, the mapping of DL/UL TCI states to codepoints in the TCI field in DCI contains two different subsets of codepoints as described below:

- a first subset of codepoints in the TCI field in DCI are mapped to only DL TCI state(s), and
- a second subset of codepoints in the TCI field in DCI are mapped both to DL TCI state(s) and UL TCI state(s)

The codepoints in all two subsets of codepoints belong to the TCI field in the same DCI (e.g., same DCI format). The two subsets of codepoints are disjoint sets.

When a UE is indicated with a codepoint from the first subset in DCI, the UE updates the UL Tx spatial filter and the DL Rx spatial filter both based on the DL TCI state that is indicated in the codepoint. The DL Rx spatial filter is updated to the DL Rx spatial filter used to receive the source reference signal in the DL TCI state that is indicated in the codepoint. The UL Tx spatial filter is updated to the DL Rx spatial filter used to receive the source reference signal in the DL TCI state. In some embodiments, the UL Tx spatial filter and the DL Rx spatial filter are updated simultaneously.

When a UE is indicated with a codepoint from the second subset in DCI, the UE updates the UL Tx spatial filter and the DL Rx spatial filter separately based on the UL TCI state and DL TCI state that are indicated in the codepoint. The DL Rx spatial filter is updated to the DL Rx spatial filter used to receive the source reference signal (e.g., QCL Type-D reference signal source) in the DL TCI state that is indicated in the codepoint. The UL Tx spatial filter is updated to one of the following:

- the UL Tx spatial filter used to transmit the source reference signal in the UL TCI state, if this source reference signal is an UL reference signal (e.g., SRS).
- the DL Rx spatial filter used to receive the source reference signal in the UL TCI state, if this source reference signal is a DL reference signal (e.g., SSB or CSI-RS). In this case, the updated UL Tx spatial filter points to the same spatial direction as that of the DL Rx spatial filter that was used to receive the source reference signal in the UL TCI state.

FIG. 16 illustrates a schematic example of how first subsets of codepoints are mapped to DL TCI states and the second subset of codepoints are mapped to separate UL and DL TCI states. In this example, a single TCI field codepoint in DCI can be used to update either.

both a DL Rx spatial filter and an UL Tx spatial filter according to the indicated DL TCI state (e.g., if TCI field codepoint 0, 1, 6 or 7 in FIG. 16 is indicated), or update the DL Rx spatial filter according to the indicated DL TCI state and update the UL spatial filter according to the indicated UL TCI state (e.g., if TCI field codepoint 2, 3, 4 or 5 in FIG. 16 is indicated).

For example, in case the indicated TCI field codepoint in DCI is 2, the UE should update the RX spatial filter based on DL TCI state 9 for DL signals/channels at the same time as it updates the TX spatial filter based on UL TCI state 1 for UL signals/channels. And, if the indicated TCI field codepoint in DCI is 0, the UE should update the TX and RX spatial filters based on DL TCI state 3 for both DL and UL signals/channels. Note that this means that we apply the behavior described in FIG. 7 for TCI field codepoint in DCIs 0, 1, 6 and 7, and the behavior described in FIG. 8 for TCI field codepoint in DCIs 2, 3, 4 and 5.

In another embodiment, a MAC CE can be used to implicitly switch between Joint DL/UL TCI and Separate DL/UL TCI (e.g., step 1102). In this embodiment, the MAC-CE message used to activate/de-activate DL and/or UL TCI states and associate them to different TCI field codepoints in DCI, is implicitly used to switch between "Joint DL/UL TCI" and "Separate DL/UL TCI". In the MAC CE message, each TCI field codepoint in DCI is either associated with one DL TCI state, one UL TCI state, or a pair of DL/UL TCI states.

After the MAC-CE message has been received and the indicated DL/UL TCI states have been activated/de-activated, if one or more UL TCI states are activated (and associated to a TCI field codepoint in DCI), the UE should assume "Separate DL/UL TCI" is applied. A DCI indicating a TCI field codepoint that is associated with a DL TCI state will only change the DL TCI state (and leave the UL TCI state unaffected), and a DCI indicating a codepoint that is associate with a UL TCI state will only change the UL TCI state (and leave the DL TCI state unaffected).

After the MAC-CE message has been received and the indicated DL/UL TCI states have been activated/de-activated, if no UL TCI states are activated, the UE should assume "Joint DL/UL TCI" is applied. A DCI indicating a TCI field codepoint that is associated with a DL TCI state will change both the DL and UL TCI state.

In an alternative embodiment, for each TCI state activated via the MAC CE an associated field is included for that TCI state which indicates if the activated TCI state applies to (1) only UL, (2) only DL, or (3) both UL and DL. If any of the activated TCI states is applied to either (1) only UL or (2) only DL, then the UE should assume that the separate DL/UL TCI states are activated for at least a subset of TCI field codepoints. If all the activated TCI states are applied to both UL and DL, then the UE should assume "Joint DL/UL TCI" is applied.

Figure 17:
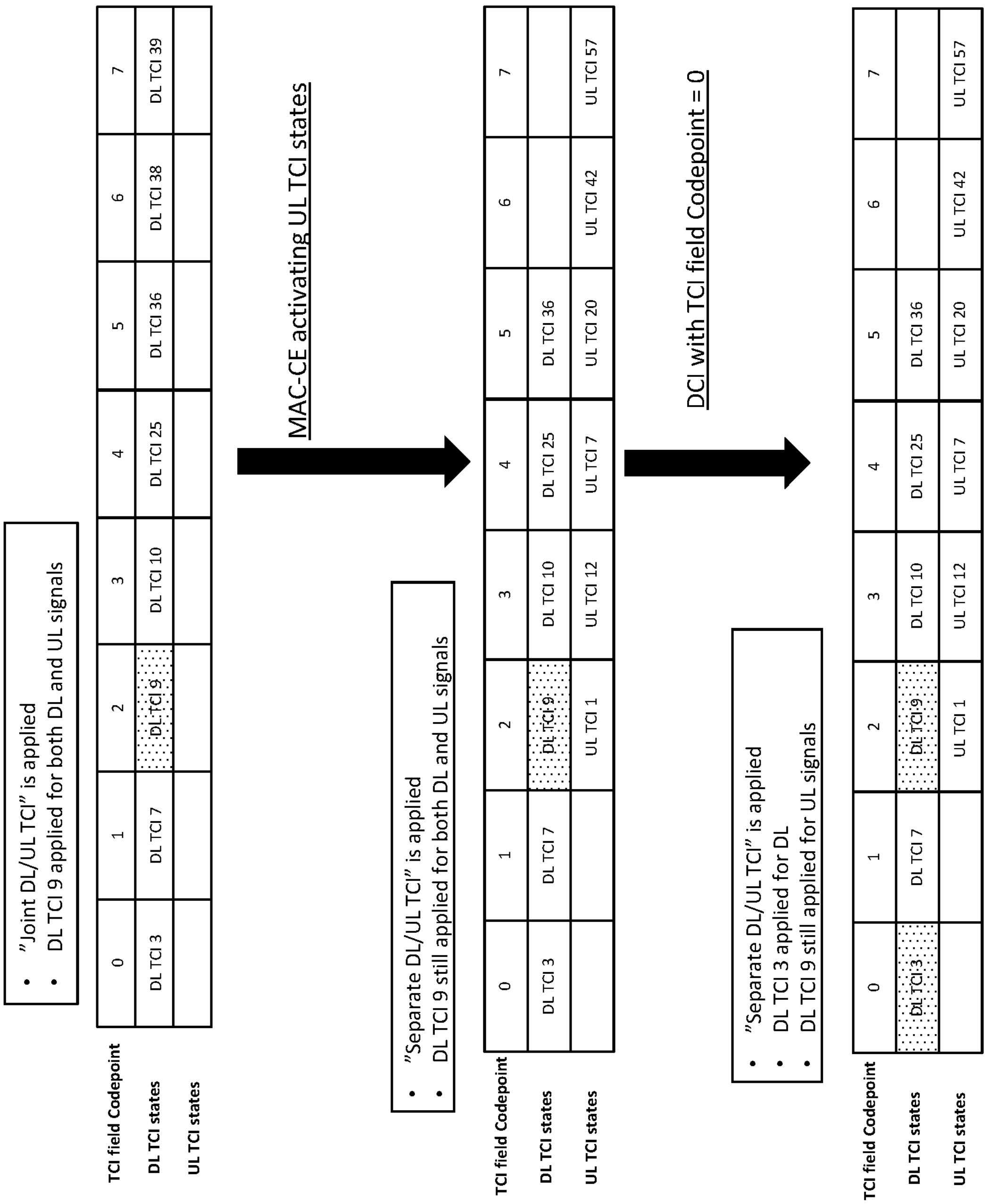
FIG. 17 illustrates one example, wherein a MAC CE message implicitly switches from Joint DL/UL TCI to Separate DL/UL TCI.

FIG. 17 illustrates one example of this embodiment, where the MAC-CE message (used to activate/de-activate DL/UL TCI states and associate them to TCI field codepoint in DCIs) implicitly switches from "Joint DL/UL TCI" to "Separate DL/UL TCI". As can be seen in FIG. 17, when the MAC-CE message activates the UL TCI states (and associates them to TCI field codepoint in DCIs), the UE should start applying "Separate DL/UL TCI" instead of "Joint DL/UL TCI". This means that the next time the UE is receiving a TCI field codepoint in DCI pointing to only a single DL TCI state, the UE should only update the RX spatial filter for DL signals/channels based on the indicated DL TCI state (as illustrated in the last step of the figure).

Figure 18:
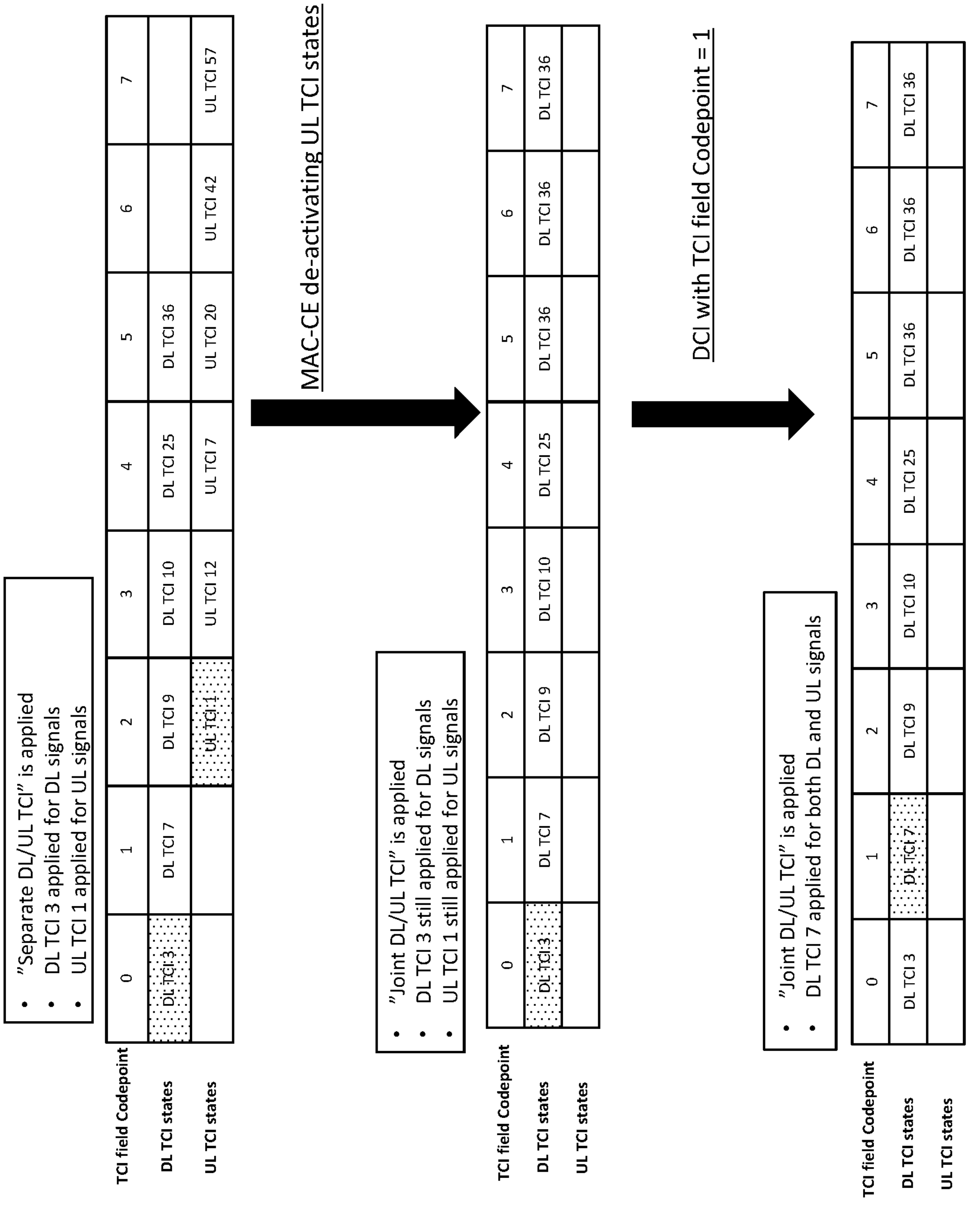
FIG. 18 illustrates another example, wherein a MAC-CE message implicitly switches from Separate DL/UL TCI to Joint DL/UL TCI.

FIG. 18 illustrates another example of this embodiment, where a MAC-CE message implicitly switches from "Separate DL/UL TCI" to "Joint DL/UL TCI". As can be seen in FIG. 18, when the MAC-CE message de-activates all UL TCI states (and their associations to TCI field codepoint in DCIs), the UE starts to apply "Joint DL/UL TCI" instead of "Separate DL/UL TCI". This means that the next time the UE is receiving a TCI field codepoint in DCI pointing at only a single DL TCI state, the UE should update the RX/TX spatial filter for both DL and UL signals/channels based on that DL TCI state (as illustrated in the last step).

In another embodiment, Radio Resource Control (RRC) signaling can be used to implicitly switch between Joint DL/UL TCI and Separate DL/UL TCI. In this embodiment, by either RRC configuring/RRC re-configuring a UE with/without UL TCI states, the UE should assume "Joint DL/UL TCI" or "Separate DL/UL TCI". In one alternative of this embodiment, the UE assumes "Separate DL/UL TCI" if at least one UL TCI is RRC configured. If no UL TCI states are RRC configured, the UE should assume "Joint DL/UL TCI". This means that even if UL TCI states are RRC configured but none of the UL TCI states have been activated and associated to an TCI field codepoint in DCI by a MAC-CE, the UE should assume "Separate DL/UL TCI", and hence the UE should not update the TX spatial filter, when the network signals a TCI field codepoint in DCI pointing at a DL DCI state.

Note that if a single DL TCI state and a single UL TCI state is RRC configured, they might be activated by default without any association to a TCI field codepoint in DCI. In this case the UE should use the DL TCI state to determine RX spatial filter for DL signals/channels and use the UL TCI state to determine TX spatial filter for UL signals/channels.

Figure 19:
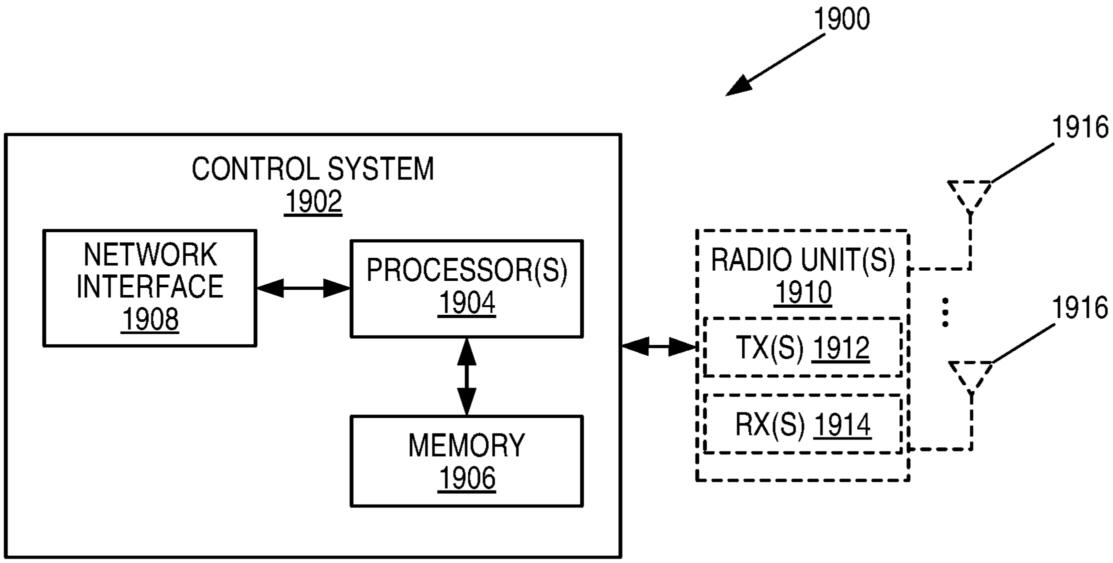
FIG. 19 is a schematic block diagram of a radio access node that can be configured to handle DL UL TCI states according to the method of FIG. 11.

FIG. 19 is a schematic block diagram of a radio access node 1900 according to some embodiments of the present disclosure. Optional features are represented by dashed boxes. The radio access node 1900 may be, for example, a base station 902 or 906 or a network node that implements all or part of the functionality of the base station 902 or gNB described herein. As illustrated, the radio access node 1900 includes a control system 1902 that includes one or more processors 1904 (e.g., Central Processing Units (CPUs), Application Specific Integrated Circuits (ASICs), Field Programmable Gate Arrays (FPGAs), and/or the like), memory 1906, and a network interface 1908. The one or more processors 1904 are also referred to herein as processing circuitry. In addition, the radio access node 1900 may include one or more radio units 1910 that each includes one or more transmitters 1912 and one or more receivers 1914 coupled to one or more antennas 1916. The radio units 1910 may be referred to or be part of radio interface circuitry. In some embodiments, the radio unit(s) 1910 is external to the control system 1902 and connected to the control system 1902 via, e.g., a wired connection (e.g., an optical cable). However, in some other embodiments, the radio unit(s) 1910 and potentially the antenna(s) 1916 are integrated together with the control system 1902. The one or more processors 1904 operate to provide one or more functions of a radio access node 1900 as described herein. In some embodiments, the function(s) are implemented in software that is stored, e.g., in the memory 1906 and executed by the one or more processors 1904.

Figure 20:
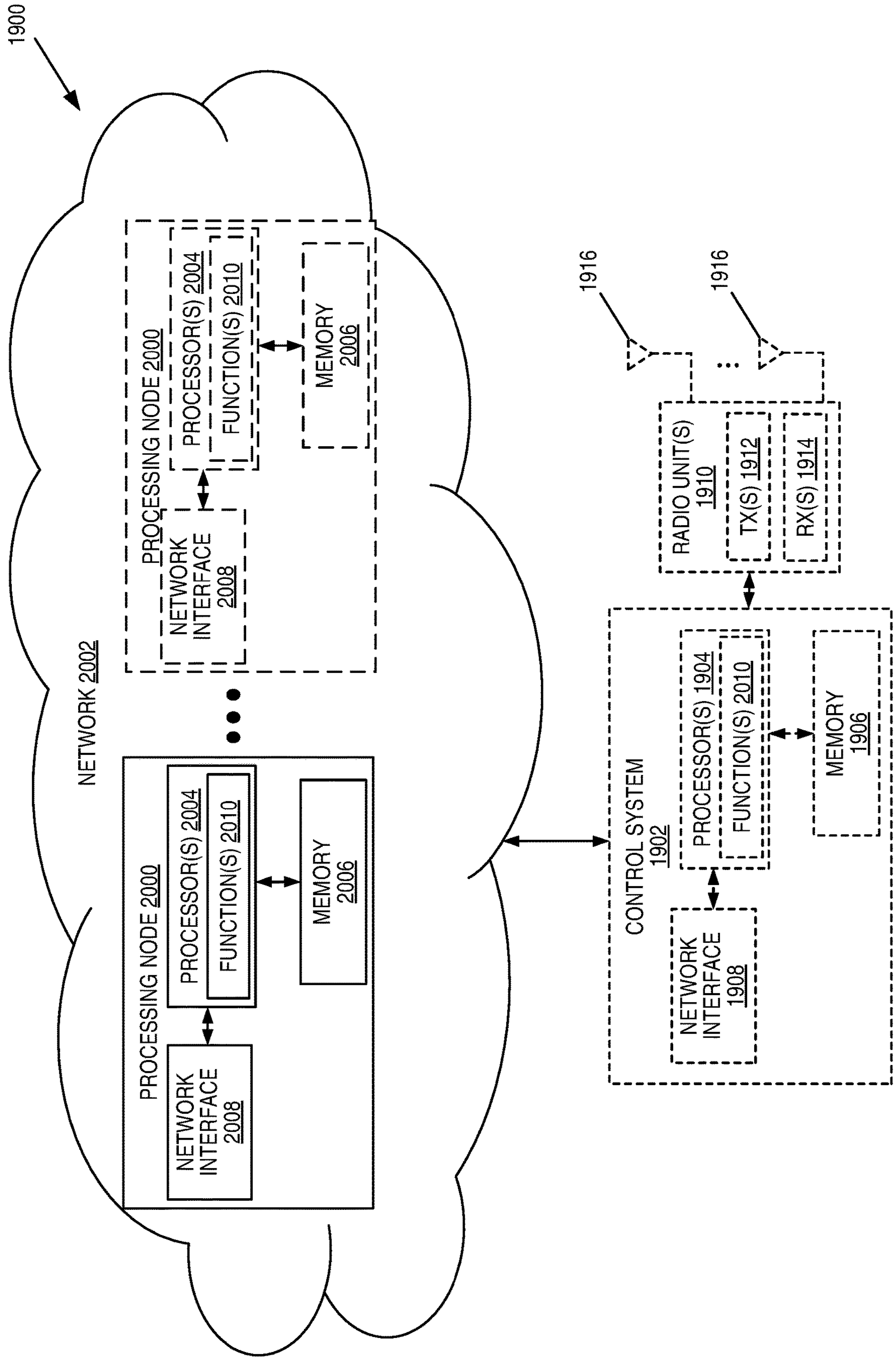
FIG. 20 is a schematic block diagram that illustrates a virtualized embodiment of the radio access node according to some embodiments of the present disclosure.

FIG. 20 is a schematic block diagram that illustrates a virtualized embodiment of the radio access node 1900 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1900 in which at least a portion of the functionality of the radio access node 1900 is implemented as a virtual component(s) (e.g., via a virtual machine(s) executing on a physical processing node(s) in a network(s)). As illustrated, in this example, the radio access node 1900 may include the control system 1902 and/or the one or more radio units 1910, as described above. The control system 1902 may be connected to the radio unit(s) 1910 via, for example, an optical cable or the like. The radio access node 1900 includes one or more processing nodes 2000 coupled to or included as part of a network(s) 2002. If present, the control system 1902 or the radio unit(s) are connected to the processing node(s) 2000 via the network 2002. Each processing node 2000 includes one or more processors 2004 (e.g., CPUs, ASICs, FPGAs, and/or the like), memory 2006, and a network interface 2008.

In this example, functions 2010 of the radio access node 1900 described herein are implemented at the one or more processing nodes 2000 or distributed across the one or more processing nodes 2000 and the control system 1902 and/or the radio unit(s) 1910 in any desired manner. In some particular embodiments, some or all of the functions 2010 of the radio access node 1900 described herein are implemented as virtual components executed by one or more virtual machines implemented in a virtual environment(s) hosted by the processing node(s) 2000. As will be appreciated by one of ordinary skill in the art, additional signaling or communication between the processing node(s) 2000 and the control system 1902 is used in order to carry out at least some of the desired functions 2010. Notably, in some embodiments, the control system 1902 may not be included, in which case the radio unit(s) 1910 communicate directly with the processing node(s) 2000 via an appropriate network interface(s).

In some embodiments, a computer program including instructions which, when executed by at least one processor, causes the at least one processor to carry out the functionality of radio access node 1900 or a node (e.g., a processing node 2000) implementing one or more of the functions 2010 of the radio access node 1900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 21:
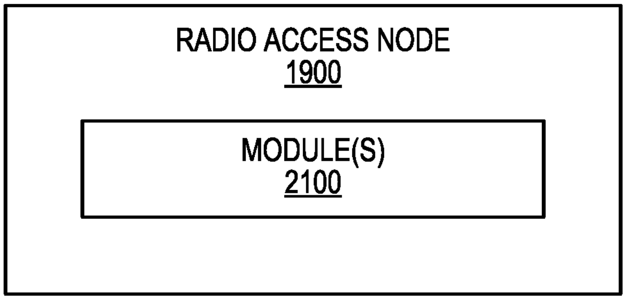
FIG. 21 is a schematic block diagram of the radio access node according to some other embodiments of the present disclosure.

FIG. 21 is a schematic block diagram of the radio access node 1900 according to some other embodiments of the present disclosure. The radio access node 1900 includes one or more modules 2100, each of which is implemented in software. The module(s) 2100 provide the functionality of the radio access node 1900 described herein. This discussion is equally applicable to the processing node 2000 of FIG. 20 where the modules 2100 may be implemented at one of the processing nodes 2000 or distributed across multiple processing nodes 2000 and/or distributed across the processing node(s) 2000 and the control system 1902.

Figure 22:
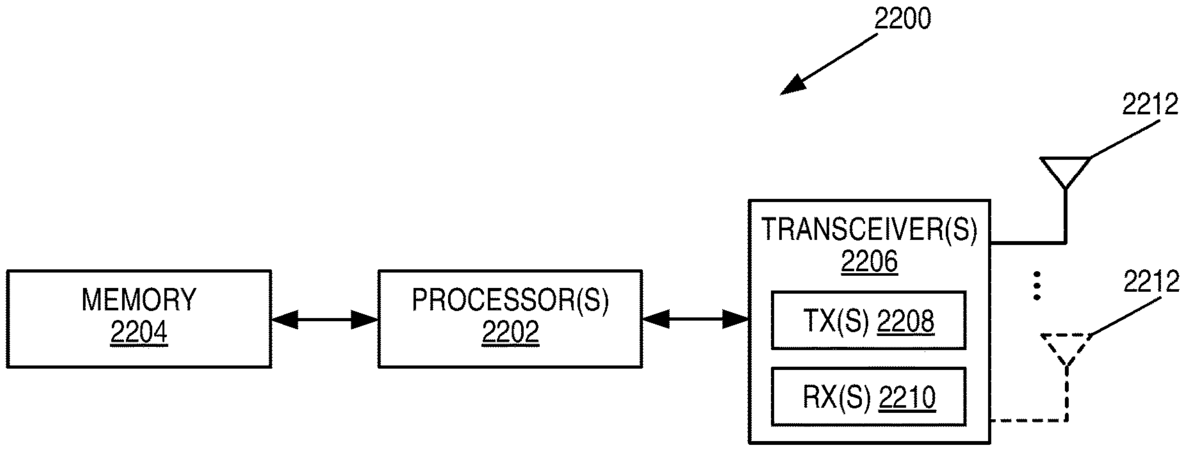
FIG. 22 is a schematic block diagram of a wireless communication device that can be configured to handle DL UL TCI states according to the method of FIG. 10.

FIG. 22 is a schematic block diagram of a wireless communication device 2200 according to some embodiments of the present disclosure. As illustrated, the wireless communication device 2200 includes one or more processors 2202 (e.g., CPUs, ASICs, FPGAs, and/or the like), memory 2204, and one or more transceivers 2206 each including one or more transmitters 2208 and one or more receivers 2210 coupled to one or more antennas 2212. The transceiver(s) 2206 includes radio-front end circuitry connected to the antenna(s) 2212 that is configured to condition signals communicated between the antenna(s) 2212 and the processor(s) 2202, as will be appreciated by on of ordinary skill in the art. The processors 2202 are also referred to herein as processing circuitry. The transceivers 2206 are also referred to herein as radio circuitry. In some embodiments, the functionality of the wireless communication device 2200 described above may be fully or partially implemented in software that is, e.g., stored in the memory 2204 and executed by the processor(s) 2202. Note that the wireless communication device 2200 may include additional components not illustrated in FIG. 22 such as, e.g., one or more user interface components (e.g., an input/output interface including a display, buttons, a touch screen, a microphone, a speaker(s), and/or the like and/or any other components for allowing input of information into the wireless communication device 2200 and/or allowing output of information from the wireless communication device 2200), a power supply (e.g., a battery and associated power circuitry), etc.

In some embodiments, a computer program including instructions which, when executed by at least one processor, causes the at least one processor to carry out the functionality of the wireless communication device 2200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 23:
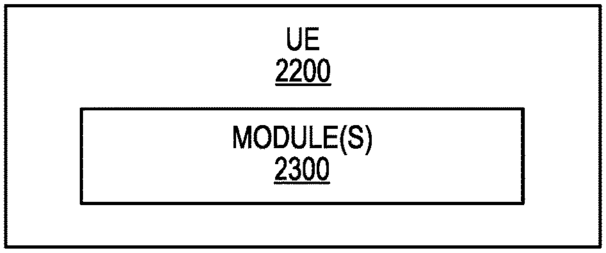
FIG. 23 is a schematic block diagram of the wireless communication device according to some other embodiments of the present disclosure.

FIG. 23 is a schematic block diagram of the wireless communication device 2200 according to some other embodiments of the present disclosure. The wireless communication device 2200 includes one or more modules 2300, each of which is implemented in software. The module(s) 2300 provide the functionality of the wireless communication device 2200 described herein.

Figure 24:
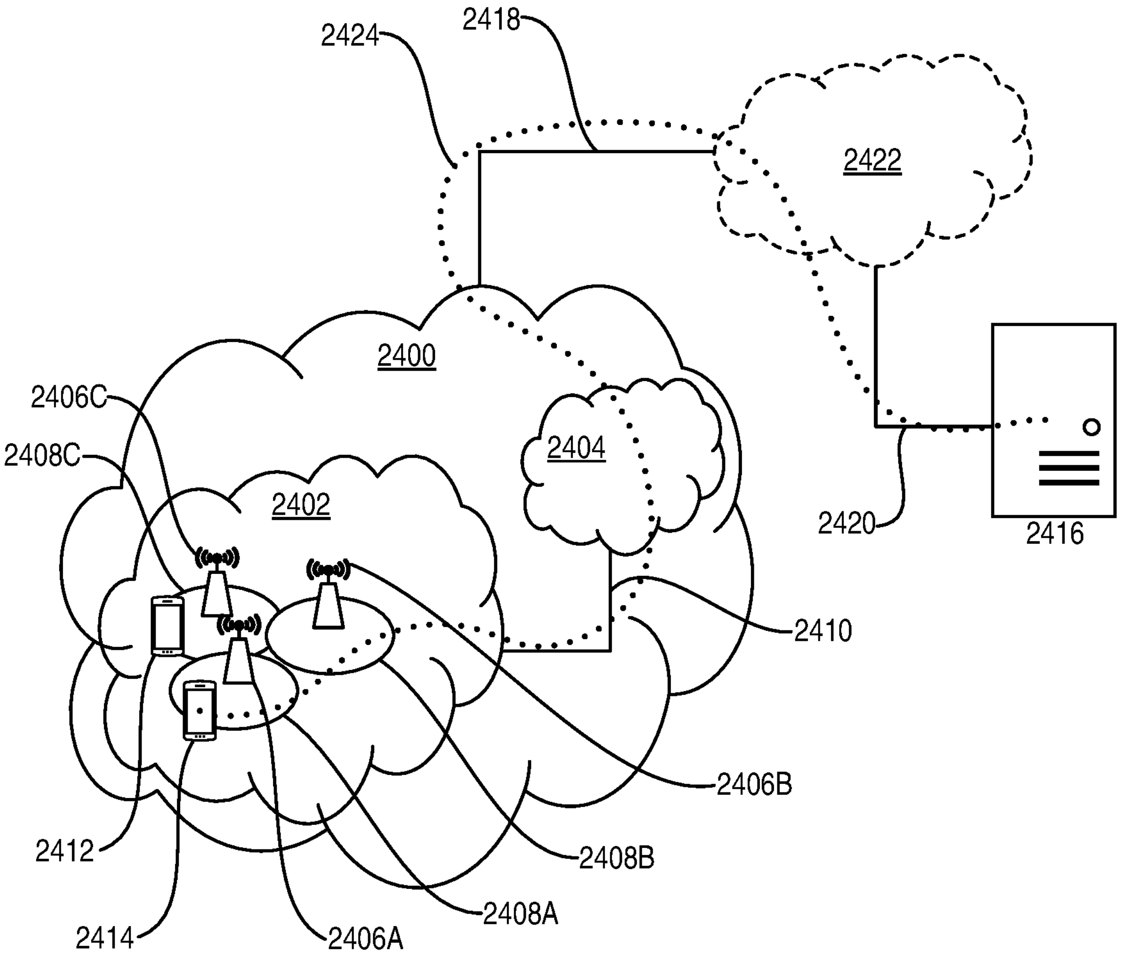
FIG. 24 is a schematic block diagram of a communication system that includes a telecommunication network in accordance with an embodiment of the present disclosure.

With reference to FIG. 24, in accordance with an embodiment, a communication system includes a telecommunication network 2400, such as a 3GPP-type cellular network, which comprises an access network 2402, such as a RAN, and a core network 2404. The access network 2402 comprises a plurality of base stations 2406A, 2406B, 2406C, such as Node Bs, eNBs, gNBs, or other types of wireless Access Points (APs), each defining a corresponding coverage area 2408A, 2408B, 2408C. Each base station 2406A, 2406B, 2406C is connectable to the core network 2404 over a wired or wireless connection 2410. A first UE 2412 located in coverage area 2408C is configured to wirelessly connect to, or be paged by, the corresponding base station 2406C. A second UE 2414 in coverage area 2408A is wirelessly connectable to the corresponding base station 2406A. While a plurality of UEs 2412, 2414 are illustrated in this example, the disclosed embodiments are equally applicable to a situation where a sole UE is in the coverage area or where a sole UE is connecting to the corresponding base station 2406.

The telecommunication network 2400 is itself connected to a host computer 2416, which may be embodied in the hardware and/or software of a standalone server, a cloud-implemented server, a distributed server, or as processing resources in a server farm. The host computer 2416 may be under the ownership or control of a service provider, or may be operated by the service provider or on behalf of the service provider. Connections 2418 and 2420 between the telecommunication network 2400 and the host computer 2416 may extend directly from the core network 2404 to the host computer 2416 or may go via an optional intermediate network 2422. The intermediate network 2422 may be one of, or a combination of more than one of, a public, private, or hosted network; the intermediate network 2422, if any, may be a backbone network or the Internet; in particular, the intermediate network 2422 may comprise two or more sub-networks (not shown).

The communication system of FIG. 24 as a whole enables connectivity between the connected UEs 2412, 2414 and the host computer 2416. The connectivity may be described as an Over-the-Top (OTT) connection 2424. The host computer 2416 and the connected UEs 2412, 2414 are configured to communicate data and/or signaling via the OTT connection 2424, using the access network 2402, the core network 2404, any intermediate network 2422, and possible further infrastructure (not shown) as intermediaries. The OTT connection 2424 may be transparent in the sense that the participating communication devices through which the OTT connection 2424 passes are unaware of routing of uplink and downlink communications. For example, the base station 2406 may not or need not be informed about the past routing of an incoming downlink communication with data originating from the host computer 2416 to be forwarded (e.g., handed over) to a connected UE 2412. Similarly, the base station 2406 need not be aware of the future routing of an outgoing uplink communication originating from the UE 2412 towards the host computer 2416.

Example implementations, in accordance with an embodiment, of the UE, base station, and host computer discussed in the preceding paragraphs will now be described with reference to FIG. 25. In a communication system 2500, a host computer 2502 comprises hardware 2504 including a communication interface 2506 configured to set up and maintain a wired or wireless connection with an interface of a different communication device of the communication system 2500. The host computer 2502 further comprises processing circuitry 2508, which may have storage and/or processing capabilities. In particular, the processing circuitry 2508 may comprise one or more programmable processors, ASICs, FPGAs, or combinations of these (not shown) adapted to execute instructions. The host computer 2502 further comprises software 2510, which is stored in or accessible by the host computer 2502 and executable by the processing circuitry 2508. The software 2510 includes a host application 2512. The host application 2512 may be operable to provide a service to a remote user, such as a UE 2514 connecting via an OTT connection 2516 terminating at the UE 2514 and the host computer 2502. In providing the service to the remote user, the host application 2512 may provide user data which is transmitted using the OTT connection 2516.

The communication system 2500 further includes a base station 2518 provided in a telecommunication system and comprising hardware 2520 enabling it to communicate with the host computer 2502 and with the UE 2514. The hardware 2520 may include a communication interface 2522 for setting up and maintaining a wired or wireless connection with an interface of a different communication device of the communication system 2500, as well as a radio interface 2524 for setting up and maintaining at least a wireless connection 2526 with the UE 2514 located in a coverage area (not shown in FIG. 25) served by the base station 2518. The communication interface 2522 may be configured to facilitate a connection 2528 to the host computer 2502. The connection 2528 may be direct or it may pass through a core network (not shown in FIG. 25) of the telecommunication system and/or through one or more intermediate networks outside the telecommunication system. In the embodiment shown, the hardware 2520 of the base station 2518 further includes processing circuitry 2530, which may comprise one or more programmable processors, ASICs, FPGAs, or combinations of these (not shown) adapted to execute instructions. The base station 2518 further has software 2532 stored internally or accessible via an external connection.

The communication system 2500 further includes the UE 2514 already referred to. The UE's 2514 hardware 2534 may include a radio interface 2536 configured to set up and maintain a wireless connection 2526 with a base station serving a coverage area in which the UE 2514 is currently located. The hardware 2534 of the UE 2514 further includes processing circuitry 2538, which may comprise one or more programmable processors, ASICs, FPGAs, or combinations of these (not shown) adapted to execute instructions. The UE 2514 further comprises software 2540, which is stored in or accessible by the UE 2514 and executable by the processing circuitry 2538. The software 2540 includes a client application 2542. The client application 2542 may be operable to provide a service to a human or non-human user via the UE 2514, with the support of the host computer 2502. In the host computer 2502, the executing host application 2512 may communicate with the executing client application 2542 via the OTT connection 2516 terminating at the UE 2514 and the host computer 2502. In providing the service to the user, the client application 2542 may receive request data from the host application 2512 and provide user data in response to the request data. The OTT connection 2516 may transfer both the request data and the user data. The client application 2542 may interact with the user to generate the user data that it provides.

Figure 25:
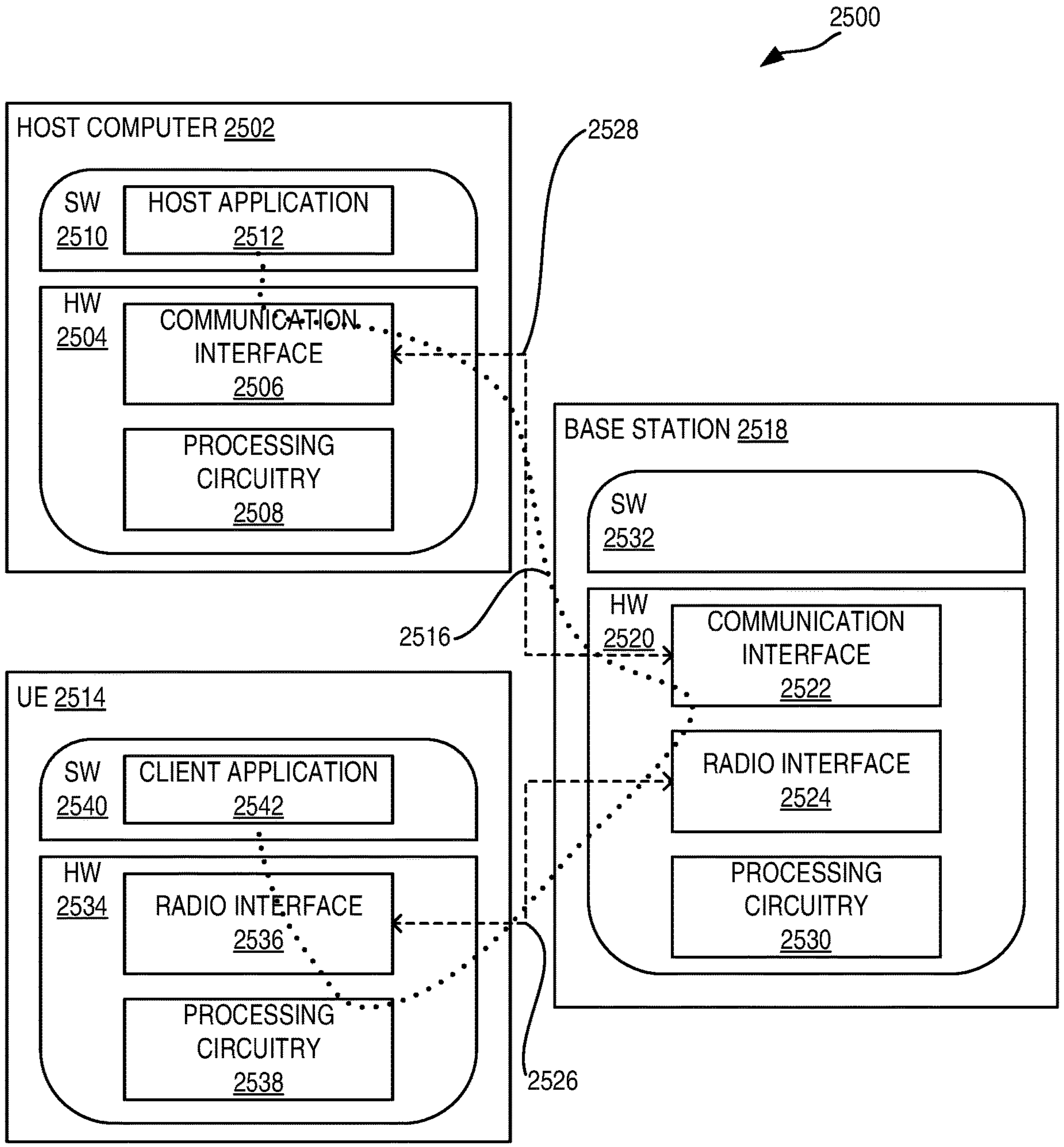
FIG. 25 is a schematic block diagram of a User Equipment (UE), a base station, and a host computer in accordance with an embodiment of the present disclosure.

It is noted that the host computer 2502, the base station 2518, and the UE 2514 illustrated in FIG. 25 may be similar or identical to the host computer 2416, one of the base stations 2406A, 2406B, 2406C, and one of the UEs 2412, 2414 of FIG. 24, respectively. This is to say, the inner workings of these entities may be as shown in FIG. 25 and independently, the surrounding network topology may be that of FIG. 24.

In FIG. 25, the OTT connection 2516 has been drawn abstractly to illustrate the communication between the host computer 2502 and the UE 2514 via the base station 2518 without explicit reference to any intermediary devices and the precise routing of messages via these devices. The network infrastructure may determine the routing, which may be configured to hide from the UE 2514 or from the service provider operating the host computer 2502, or both. While the OTT connection 2516 is active, the network infrastructure may further take decisions by which it dynamically changes the routing (e.g., on the basis of load balancing consideration or reconfiguration of the network).

The wireless connection 2526 between the UE 2514 and the base station 2518 is in accordance with the teachings of the embodiments described throughout this disclosure. One or more of the various embodiments improve the performance of OTT services provided to the UE 2514 using the OTT connection 2516, in which the wireless connection 2526 forms the last segment.

A measurement procedure may be provided for the purpose of monitoring data rate, latency, and other factors on which the one or more embodiments improve. There may further be an optional network functionality for reconfiguring the OTT connection 2516 between the host computer 2502 and the UE 2514, in response to variations in the measurement results. The measurement procedure and/or the network functionality for reconfiguring the OTT connection 2516 may be implemented in the software 2510 and the hardware 2504 of the host computer 2502 or in the software 2540 and the hardware 2534 of the UE 2514, or both. In some embodiments, sensors (not shown) may be deployed in or in association with communication devices through which the OTT connection 2516 passes; the sensors may participate in the measurement procedure by supplying values of the monitored quantities exemplified above, or supplying values of other physical quantities from which the software 2510, 2540 may compute or estimate the monitored quantities. The reconfiguring of the OTT connection 2516 may include message format, retransmission settings, preferred routing, etc.; the reconfiguring need not affect the base station 2518, and it may be unknown or imperceptible to the base station 2518. Such procedures and functionalities may be known and practiced in the art. In certain embodiments, measurements may involve proprietary UE signaling facilitating the host computer 2502's measurements of throughput, propagation times, latency, and the like. The measurements may be implemented in that the software 2510 and 2540 causes messages to be transmitted, in particular empty or 'dummy' messages, using the OTT connection 2516 while it monitors propagation times, errors, etc.

Figure 26:
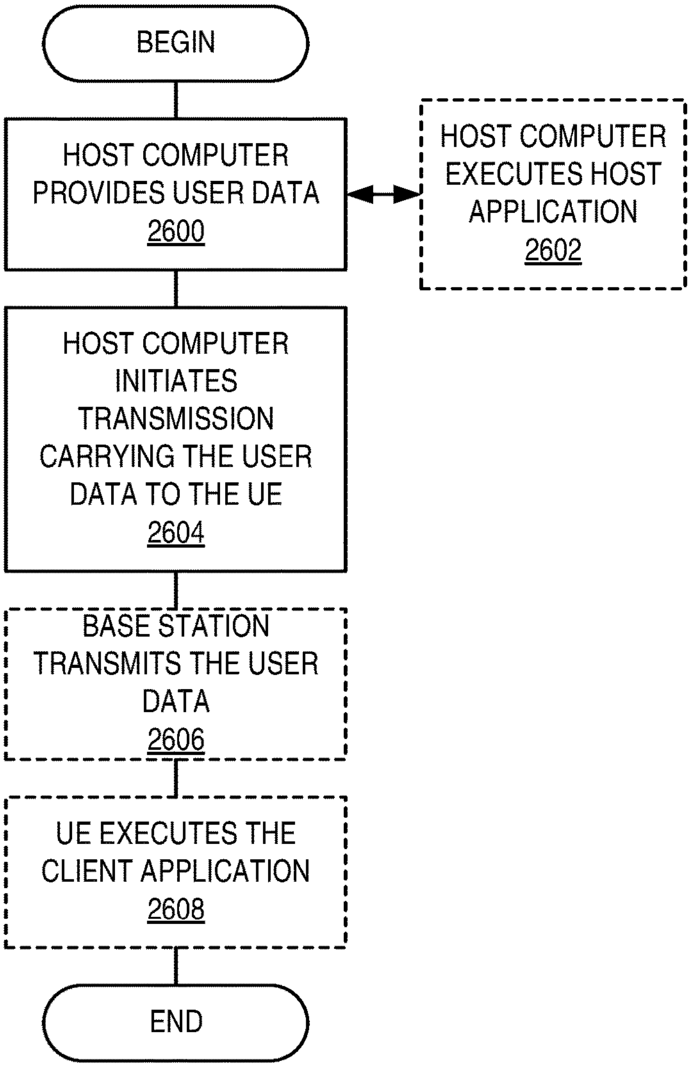
FIG. 26 is a flowchart illustrating a method implemented in a communication system in accordance with one embodiment of the present disclosure.

FIG. 26 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 26 will be included in this section. In step 2600, the host computer provides user data. In sub-step 2602 (which may be optional) of step 2600, the host computer provides the user data by executing a host application. In step 2604, the host computer initiates a transmission carrying the user data to the UE. In step 2606 (which may be optional), the base station transmits to the UE the user data which was carried in the transmission that the host computer initiated, in accordance with the teachings of the embodiments described throughout this disclosure. In step 2608 (which may also be optional), the UE executes a client application associated with the host application executed by the host computer.

Figure 27:
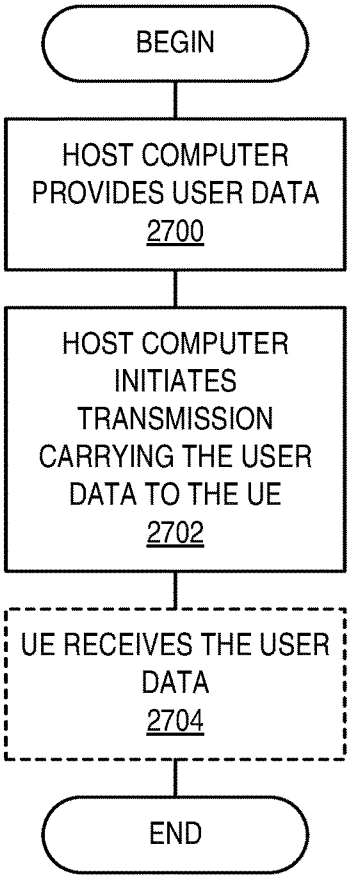
FIG. 27 is a flowchart illustrating a method implemented in a communication system in accordance with one embodiment of the present disclosure.

FIG. 27 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 27 will be included in this section. In step 2700 of the method, the host computer provides user data. In an optional sub-step (not shown) the host computer provides the user data by executing a host application. In step 2702, the host computer initiates a transmission carrying the user data to the UE. The transmission may pass via the base station, in accordance with the teachings of the embodiments described throughout this disclosure. In step 2704 (which may be optional), the UE receives the user data carried in the transmission.

Figure 28:
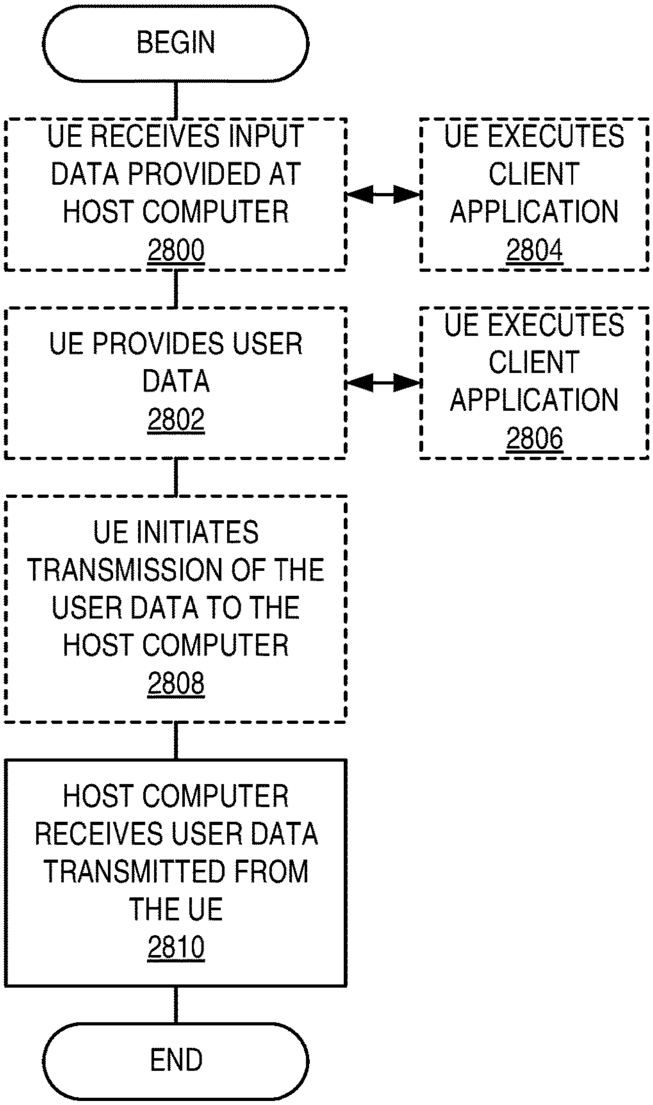
FIG. 28 is a flowchart illustrating a method implemented in a communication system in accordance with one embodiment of the present disclosure.

FIG. 28 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 28 will be included in this section. In step 2800 (which may be optional), the UE receives input data provided by the host computer. Additionally or alternatively, in step 2802, the UE provides user data. In sub-step 2804 (which may be optional) of step 2800, the UE provides the user data by executing a client application. In sub-step 2806 (which may be optional) of step 2802, the UE executes a client application which provides the user data in reaction to the received input data provided by the host computer. In providing the user data, the executed client application may further consider user input received from the user. Regardless of the specific manner in which the user data was provided, the UE initiates, in sub-step 2808 (which may be optional), transmission of the user data to the host computer. In step 2810 of the method, the host computer receives the user data transmitted from the UE, in accordance with the teachings of the embodiments described throughout this disclosure.

Figure 29:
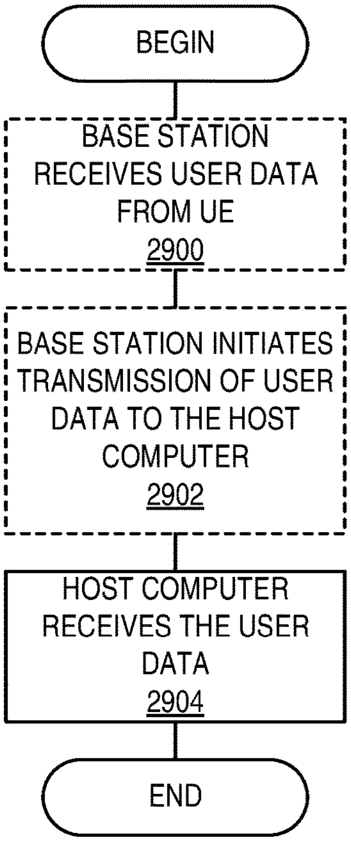
FIG. 29 is a flowchart illustrating a method implemented in a communication system in accordance with one embodiment of the present disclosure.

FIG. 29 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 29 will be included in this section. In step 2900 (which may be optional), in accordance with the teachings of the embodiments described throughout this disclosure, the base station receives user data from the UE. In step 2902 (which may be optional), the base station initiates transmission of the received user data to the host computer. In step 2904 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some exemplary embodiments of the present disclosure are as follows.

Embodiment 1: A method performed by a wireless device for handling downlink and uplink TCI states is provided. The method includes receiving (1200) a DCI. The DCI includes one or more of: a first subset of TCI field codepoints each associated with a respective downlink TCI state, a second subset of TCI field codepoints each associated with a respective uplink TCI state, and a third subset of TCI field codepoints each associated with one of: a respective downlink TCI state and a respective uplink TCI state; and a respective joint TCI state. The method also includes receiving (1202) an indication that indicates a selected TCI field codepoint among the first subset of TCI field codepoints, the second subset of the TCI field codepoints, and the third subset of the TCI field codepoints. The method also includes performing (1204) one or more actions based on the selected TCI field codepoint.

Embodiment 2: Wherein receiving (1202) the indication comprises receiving (1202-1) the indication that indicates the selected TCI field codepoint in the first subset of TCI field codepoints. Wherein performing (1204) the one or more actions comprises updating (1204-1*a*) a downlink receive spatial filter based on the respective downlink TCI state associated with the selected TCI field codepoint.

Embodiment 3: Wherein the downlink receive spatial filter is updated to a downlink receive spatial filter used to receive a downlink source reference signal (e.g., QCL Type-D source reference signal) in a respective downlink TCI state associated with the selected TCI field codepoint.

Embodiment 4: Wherein performing (1204) the one or more actions further comprises maintaining (1204-1*b*) an existing uplink transmit spatial filter.

Embodiment 5: Wherein receiving (1202) the indication comprises receiving (1202-2) the indication that indicates the selected TCI field codepoint in the second subset of TCI field codepoints. Wherein performing (1204) the one or more actions comprises updating (1204-2*a*) an uplink transmit spatial filter based on the respective uplink TCI state associated with the selected TCI field codepoint.

Embodiment 6: Wherein the uplink transmit spatial filter is updated to one of: an uplink transmit spatial filter used to transmit an uplink source reference signal (e.g., SRS) in the respective uplink TCI state associated with the selected TCI field codepoint; and a downlink receive spatial filter used to receive a downlink source reference signal (e.g., SSB or CSI-RS) in the respective uplink TCI state associated with the selected TCI field codepoint.

Embodiment 7: Wherein performing (1204) one or more actions further comprises maintaining (1204-2*b*) an existing downlink receive spatial filter.

Embodiment 8: Wherein receiving (1202) the indication comprises receiving (1202-3) the indication that indicates the selected TCI field codepoint in the third subset of TCI field codepoints. Wherein performing (1204) the one or more actions comprises one of: performing (1204-3*a*) a separate-TCI scheme to thereby update a downlink receive spatial filter and an uplink transmit spatial filter based on the respective downlink TCI state and the respective uplink TCI state associated with the selected TCI field codepoint, respectively; and performing (1204-3*b*) a joint-TCI scheme to thereby update the downlink receive spatial filter and the uplink transmit spatial filter based on the respective joint TCI state.

Embodiment 9: Wherein the downlink receive spatial filter is updated to a downlink receive spatial filter used to receive a downlink source reference signal (e.g., QCL Type-D source reference signal) in a respective downlink TCI state associated with the selected TCI field codepoint. Wherein the uplink transmit spatial filter is updated to one of: an uplink transmit spatial filter used to transmit an uplink source reference signal (e.g., SRS) in the respective uplink TCI state associated with the selected TCI field codepoint; and a downlink receive spatial filter used to receive a downlink source reference signal (e.g., SSB or CSI-RS) in the respective uplink TCI state associated with the selected TCI field codepoint.

Embodiment 10: Wherein performing (1204) one or more actions further comprises updating (1204-3*c*) the downlink receive spatial filter and the uplink transmit spatial filter simultaneously.

Embodiment 11: The method also includes receiving (1206) a message (e.g., MAC-CE message or RRC message) that activates or deactivates one or more uplink TCI states. The method also includes switching (1208) from performing (1204-3*b*) the joint-TCI scheme to performing (1204-3*a*) the separate-TCI scheme in response to activation of the one or more uplink TCI states. The method also includes switching (1210) from performing (1204-3*a*) the separate-TCI scheme to performing (1204-3*b*) the joint-TCI scheme in response to deactivation of the one or more uplink TCI states.

Embodiment 12: Wherein activation of the one or more uplink TCI states comprises activation of at least one of the one or more uplink TCI states. Wherein deactivation of the one or more uplink TCI states comprises deactivation of all of the one or more uplink TCI states.

Embodiment 13: A method performed by a base station for handling downlink and uplink TCI states is provided. The method includes transmitting (1300) a DCI that includes one or more of: a first subset of TCI field codepoints each associated with a respective downlink TCI state; a second subset of TCI field codepoints each associated with a respective uplink TCI state; and a third subset of TCI field codepoints each associated with one of: a respective downlink TCI state and a respective uplink TCI state; and a respective joint TCI state. The method also includes transmitting (1302) an indication that indicates a selected TCI field codepoint among the first subset of TCI field codepoints, the second subset of the TCI field codepoints, and the third subset of the TCI field codepoints.

Embodiment 14: Wherein transmitting (1302) the indication comprises transmitting (1302-1) the indication that indicates the selected TCI field codepoint in the first subset of TCI field codepoints.

Embodiment 15: Wherein transmitting (1302) the indication comprises transmitting (1302-2) the indication that indicates the selected TCI field codepoint in the second subset of TCI field codepoints.

Embodiment 16: Wherein transmitting (1302) the indication comprises transmitting (1302-3) the indication that indicates the selected TCI field codepoint in the third subset of TCI field codepoints.

Embodiment 17: The method also includes transmitting (1304) a message (e.g., MAC-CE message or RRC message) that activates or deactivates one or more uplink TCI states.

Embodiment 18: A wireless device (2200) for handling downlink and uplink TCI states is provided. The wireless device (2200) includes processing circuitry (2202) configured to cause the wireless device (2200) to perform any of the steps in the method performed by the wireless device. The wireless device (2200) also includes power supply circuitry configured to supply power to the wireless device (2200).

Embodiment 19: A base station (1900) for handling downlink and uplink TCI states is provided. The base station (1900) includes processing circuitry (1902) configured to cause the base station (1900) to perform any of the steps in the method performed by the base station. The base station (1900) also includes power supply circuitry configured to supply power to the base station (1900).

Embodiment 20: A UE for handling downlink and uplink TCI states is provided. The UE includes an antenna configured to send and receive wireless signals. The UE also includes radio front-end circuitry connected to the antenna and to processing circuitry and configured to condition signals communicated between the antenna and the processing circuitry. Wherein the processing circuitry being configured to perform any of the steps in the method performed by the wireless device. The UE also includes an input interface connected to the processing circuitry and configured to allow input of information into the UE to be processed by the processing circuitry. The UE also includes an output interface connected to the processing circuitry and configured to output information from the UE that has been processed by the processing circuitry. The UE also includes a battery connected to the processing circuitry and configured to supply power to the UE.

Embodiment 21: A communication system including a host computer. The host computer includes processing circuitry configured to provide user data and a communication interface configured to forward the user data to a cellular network for transmission to a UE. Wherein the cellular network comprises a base station having a radio interface and processing circuitry, the base station's processing circuitry is configured to perform any of the steps in the method performed by the base station.

Embodiment 22: The communication system further including the base station.

Embodiment 23: The communication system further including the UE, wherein the UE is configured to communicate with the base station.

Embodiment 24: The processing circuitry of the host computer is configured to execute a host application, thereby providing the user data. The UE comprises processing circuitry configured to execute a client application associated with the host application.

Embodiment 25: A method implemented in a communication system including a host computer, a base station, and a UE is provided. The method includes, at the host computer, providing user data and, at the host computer, initiating a transmission carrying the user data to the UE via a cellular network comprising the base station, wherein the base station performs any of the steps in the method performed by the base station.

Embodiment 26: The method further comprising, at the base station, transmitting the user data.

Embodiment 27: Wherein the user data is provided at the host computer by executing a host application, the method further comprising, at the UE, executing a client application associated with the host application.

Embodiment 28: A UE configured to communicate with a base station, the UE comprising a radio interface and processing circuitry configured to perform the method of embodiments 25 to 27.

Embodiment 29: A communication system including a host computer is provided. The host computer includes processing circuitry configured to provide user data and a communication interface configured to forward user data to a cellular network for transmission to a UE. Wherein the UE comprises a radio interface and processing circuitry, the UE's components configured to perform any of the steps in the method performed by the wireless device.

Embodiment 30: Wherein the cellular network further includes a base station configured to communicate with the UE.

Embodiment 31: Wherein the processing circuitry of the host computer is configured to execute a host application, thereby providing the user data. Wherein the UE's processing circuitry is configured to execute a client application associated with the host application.

Embodiment 32: A method implemented in a communication system including a host computer, a base station, and a UE is provided. The method includes, at the host computer, providing user data and, at the host computer, initiating a transmission carrying the user data to the UE via a cellular network comprising the base station, wherein the UE performs any of the steps in the method performed by the wireless device.

Embodiment 33: The method further comprising at the UE, receiving the user data from the base station.

Embodiment 34: A communication system including a host computer is provided. The host computer includes communication interface configured to receive user data originating from a transmission from a UE to a base station. Wherein the UE comprises a radio interface and processing circuitry, the UE's processing circuitry configured to perform any of the steps in the method performed by the wireless device.

Embodiment 35: The communication system further including the UE.

Embodiment 36: The communication system further including the base station. Wherein the base station comprises a radio interface configured to communicate with the UE and a communication interface configured to forward to the host computer the user data carried by a transmission from the UE to the base station.

Embodiment 37: Wherein the processing circuitry of the host computer is configured to execute a host application. Wherein the UE's processing circuitry is configured to execute a client application associated with the host application, thereby providing the user data.

Embodiment 38: Wherein the processing circuitry of the host computer is configured to execute a host application, thereby providing request data. Wherein the UE's processing circuitry is configured to execute a client application associated with the host application, thereby providing the user data in response to the request data.

Embodiment 39: A method implemented in a communication system including a host computer, a base station, and a UE is provided. The method includes, at the host computer, receiving user data transmitted to the base station from the UE, wherein the UE performs any of the steps in the method performed by the wireless device.

Embodiment 40: The method further comprising, at the UE, providing the user data to the base station.

Embodiment 41: The method further comprising, at the UE, executing a client application, thereby providing the user data to be transmitted and, at the host computer, executing a host application associated with the client application.

Embodiment 42: The method further comprising, at the UE, executing a client application and, at the UE, receiving input data to the client application, the input data being provided at the host computer by executing a host application associated with the client application. Wherein the user data to be transmitted is provided by the client application in response to the input data.

Embodiment 43: A communication system including a host computer comprising a communication interface configured to receive user data originating from a transmission from a UE to a base station. Wherein the base station comprises a radio interface and processing circuitry, the base station's processing circuitry configured to perform any of the steps in the method performed by the base station.

Embodiment 44: The communication system further including the base station.

Embodiment 45: The communication system further including the UE, wherein the UE is configured to communicate with the base station.

Embodiment 46: Wherein the processing circuitry of the host computer is configured to execute a host application. Wherein the UE is configured to execute a client application associated with the host application, thereby providing the user data to be received by the host computer.

Embodiment 47: A method implemented in a communication system including a host computer, a base station, and a UE is provided. The method includes, at the host computer, receiving, from the base station, user data originating from a transmission which the base station has received from the UE. Wherein the UE performs any of the steps in the method performed by the wireless device.

Embodiment 48: The method further comprising at the base station, receiving the user data from the UE.

Embodiment 49: The method further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
BWP Bandwidth Part
CE Control Element
CSI-RS Channel State Information Reference Signal
CP-OFDM Cyclic Prefix Orthogonal Frequency Division Multiplexing
CPU Central Processing Unit
CRB Common Resource Block
CSI-RS Channel State Information Reference Signal
DCI Downlink Control Information
DFT Discrete Fourier Transform
DMRS Demodulation Reference Signal
DN Data Network
DL Downlink
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LCID Logical Channel ID
LTE Long Term Evolution
MAC Medium Access Control
MME Mobility Management Entity
MPE Maximum Permissible Exposure
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
PDCCH Physical Downlink Control Channel
PDCH Physical Data Channel
PDSCHPhysical Downlink Data Channel
PDU Protocol Data Unit
P-GW Packet Data Network Gateway
PRB Physical Resource Block
PUSCHPhysical Uplink Data Channel
QCL Quasi Co-Located
QoS Quality of Service
RAM Random Access Memory
RAN Radio Access Network
RB Resource Block
ROM Read Only Memory
RRC Radio Resource Control
RRH Remote Radio Head
RTT Round Trip Time
SCEF Service Capability Exposure Function
SINR Signal to Interference and Noise Ratio
SMF Session Management Function
TCI Transmission Configuration Indicator
TRP Signal to Interference and Noise Ratio
TRS Tracking Reference Signal
UDM Unified Data Management
UE User Equipment
UL Uplink
UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless device for handling downlink and uplink Transmission Configuration Indicator, TCI, states, the method comprising:

receiving a Downlink Control Information, DCI, comprising an indication that indicates a selected TCI field codepoint among:

a first subset of TCI field codepoints each associated with a respective downlink TCI state;

a second subset of TCI field codepoints each associated with a respective uplink TCI state; and a third subset of TCI field codepoints each associated with a respective downlink TCI state and a respective uplink TCI state; and performing one or more actions based on the selected TCI field codepoint, and wherein, prior to receiving the DCI, the wireless device is configured by a Medium Access Control, MAC, Control Element, CE, and the MAC CE is configured to:

associate each of the first subset of TCI field codepoints with the respective downlink TCI state;

associate each of the second subset of TCI field codepoints with the respective uplink TCI state; and associate each of the third subset of TCI field codepoints with the respective downlink TCI state and the respective uplink TCI state, and wherein for each TCI state activated via the MAC CE, one or more associated fields in the MAC CE are included to indicate whether the activated TCI state applies to uplink only, downlink only, or both downlink and uplink.

2. The method of claim 1, wherein:
receiving the DCI comprising the indication comprises receiving the indication that indicates the selected TCI field codepoint in the first subset of TCI field codepoints; and
performing the one or more actions comprises updating a downlink receive spatial filter based on the respective downlink TCI state associated with the selected TCI field codepoint.

3. The method of claim 2, wherein the downlink receive spatial filter is updated to a downlink receive spatial filter used to receive a downlink source reference signal in a respective downlink TCI state associated with the selected TCI field codepoint.

4. The method of claim 1, wherein:
receiving the DCI comprising the indication comprises receiving the indication that indicates the selected TCI field codepoint in the second subset of TCI field codepoints; and
performing the one or more actions comprises updating an uplink transmit spatial filter based on the respective uplink TCI state associated with the selected TCI field codepoint.

5. The method of claim 4, wherein the uplink transmit spatial filter is updated to one of:
an uplink transmit spatial filter used to transmit an uplink source reference signal in the respective uplink TCI state associated with the selected TCI field codepoint; and
a downlink receive spatial filter used to receive a downlink source reference signal in the respective uplink TCI state associated with the selected TCI field codepoint.

6. The method of claim 1, wherein:
receiving the indication comprises receiving the indication that indicates the selected TCI field codepoint in the third subset of TCI field codepoints; and
performing the one or more actions comprises performing a separate-TCI scheme to thereby update a downlink receive spatial filter and an uplink transmit spatial filter based on the respective downlink TCI state and the respective uplink TCI state associated with the selected TCI field codepoint, respectively.

7. The method of claim 6, wherein:
the downlink receive spatial filter is updated to a downlink receive spatial filter used to receive a downlink source reference signal in a respective downlink TCI state associated with the selected TCI field codepoint; and
the uplink transmit spatial filter is updated to one of:
an uplink transmit spatial filter used to transmit an uplink source reference signal in the respective uplink TCI state associated with the selected TCI field codepoint; and
a downlink receive spatial filter used to receive a downlink source reference signal in the respective uplink TCI state associated with the selected TCI field codepoint.

8. A wireless device comprising:
processing circuitry configured to cause the wireless device to:
receive a Downlink Control Information, DCI, comprising an indication that indicates a selected TCI field codepoint among:
a first subset of TCI field codepoints each associated with a respective downlink TCI state;
a second subset of TCI field codepoints each associated with a respective uplink TCI state; and
a third subset of TCI field codepoints each associated with a respective downlink TCI state and a respective uplink TCI state; and
perform one or more actions based on the selected TCI field codepoint; and
wherein, prior to receiving the DCI, the processing circuitry is further configured to cause the wireless device to be configured by a Medium Access Control, MAC, Control Element, CE, and the MAC CE is configured to:
associate each of the first subset of TCI field codepoints with the respective downlink TCI state;
associate each of the second subset of TCI field codepoints with the respective uplink TCI state; and
associate each of the third subset of TCI field codepoints with the respective downlink TCI state and the respective uplink TCI state; and
wherein for each TCI state activated via the MAC CE, one or more associated fields in the MAC CE are included to indicate whether the activated TCI state applies to uplink only, downlink only, or both downlink and uplink.

9. The wireless device of claim 8, wherein the processing circuitry is further configured to cause the wireless device to:
receive the indication that indicates the selected TCI field codepoint in the first subset of TCI field codepoints when receiving the DCI comprising the indication; and
update a downlink receive spatial filter based on the respective downlink TCI state associated with the selected TCI field codepoint when performing the one or more actions.

10. The wireless device of claim 9, wherein the downlink receive spatial filter is updated to a downlink receive spatial filter used to receive a downlink source reference signal in a respective downlink TCI state associated with the selected TCI field codepoint.

11. The wireless device of claim 8, wherein the processing circuitry is further configured to cause the wireless device to:
receive the indication that indicates the selected TCI field codepoint in the second subset of TCI field codepoints when receiving the DCI comprising the indication; and
update an uplink transmit spatial filter based on the respective uplink TCI state associated with the selected TCI field codepoint when performing the one or more actions.

12. The wireless device of claim 11, wherein the uplink transmit spatial filter is updated to one of:
an uplink transmit spatial filter used to transmit an uplink source reference signal in the respective uplink TCI state associated with the selected TCI field codepoint; and
a downlink receive spatial filter used to receive a downlink source reference signal in the respective uplink TCI state associated with the selected TCI field codepoint.

13. The wireless device of claim 8, wherein the processing circuitry is further configured to cause the wireless device to:
receive the indication that indicates the selected TCI field codepoint in the third subset of TCI field codepoints when receiving the indication; and perform a separate-TCI scheme to thereby update a downlink receive spatial filter and an uplink transmit spatial filter based on the respective downlink TCI state and the respective uplink TCI state associated with the selected TCI field codepoint, respectively, when performing the one or more actions.

14. The wireless device of claim 8, wherein:

the downlink receive spatial filter is updated to a downlink receive spatial filter used to receive a downlink source reference signal in a respective downlink TCI state associated with the selected TCI field codepoint; and the uplink transmit spatial filter is updated to one of:

an uplink transmit spatial filter used to transmit an uplink source reference signal in the respective uplink TCI state associated with the selected TCI field codepoint; and a downlink receive spatial filter used to receive a downlink source reference signal in the respective uplink TCI state associated with the selected TCI field codepoint.

15. A method performed by a base station for handling downlink and uplink Transmission Configuration Indicator, TCI, states, the method comprising:

transmitting a Downlink Control Information, DCI, comprising an indication that indicates a selected TCI field codepoint among:

a first subset of TCI field codepoints each associated with a respective downlink TCI state;

a second subset of TCI field codepoints each associated with a respective uplink TCI state; and a third subset of TCI field codepoints each associated with a respective downlink TCI state and a respective uplink TCI state, and wherein, prior to transmitting the DCI, the base station configures a wireless device via a Medium Access Control, MAC, Control Element, CE, and the MAC CE is configured to:

associate each of the first subset of TCI field codepoints with the respective downlink TCI state;

associate each of the second subset of TCI field codepoints with the respective uplink TCI state; and associate each of the third subset of TCI field codepoints with the respective downlink TCI state and the respective uplink TCI state; and wherein for each TCI state activated via the MAC CE, one or more associated fields in the MAC CE are included to indicate whether the activated TCI state applies to uplink only, downlink only, or both downlink and uplink.

16. The method of claim 15, wherein transmitting the DCI comprising the indication comprises:

transmitting the indication that indicates the selected TCI field codepoint in the first subset of TCI field codepoints, transmitting the indication that indicates the selected TCI field codepoint in the second subset of TCI field codepoints, and/or transmitting the indication that indicates the selected TCI field codepoint in the third subset of TCI field codepoints.

17. A base station comprising:

processing circuitry configured to cause the base station to:

transmit a Downlink Control Information, DCI, comprising an indication that indicates a selected TCI field codepoint among:

a first subset of TCI field codepoints each associated with a respective downlink TCI state;

a second subset of TCI field codepoints each associated with a respective uplink TCI state; and a third subset of TCI field codepoints each associated with a respective downlink TCI state and a respective uplink TCI state; and wherein, prior to transmitting the DCI, the processing circuitry is further configured to cause the base station to configure a wireless device via a Medium Access Control, MAC, Control Element, CE, and the MAC CE is configured to:

associate each of the first subset of TCI field codepoints with the respective downlink TCI state;

associate each of the second subset of TCI field codepoints with the respective uplink TCI state; and associate each of the third subset of TCI field codepoints with the respective downlink TCI state and the respective uplink TCI state; and wherein for each TCI state activated via the MAC CE, one or more associated fields in the MAC CE are included to indicate whether the activated TCI state applies to uplink only, downlink only, or both downlink and uplink.

18. The base station of claim 17, wherein the processing circuitry is further configured to cause the base station to:

transmit the indication that indicates the selected TCI field codepoint in the first subset of TCI field codepoints when transmitting the DCI comprising the indication, transmit the indication that indicates the selected TCI field codepoint in the second subset of TCI field codepoints when transmitting the DCI comprising the indication, and/or transmit the indication that indicates the selected TCI field codepoint in the third subset of TCI field codepoints when transmitting the DCI comprising the indication.

* * * * *